United States Patent [19]

Keiser, II et al.

[11] Patent Number: 5,214,696
[45] Date of Patent: May 25, 1993

[54] DATA PROCESSING SYSTEM AND METHOD TO PRODUCE SOFTCOPY BOOK READERS WHICH ARE LIMITED TO READING ONLY BOOKS PUBLISHED BY A SPECIFIC PUBLISHER

[75] Inventors: Harry R. Keiser, II, Rockville; Jeffrey N. Stevens, Gaithersburg; Jay Unger, Darnestown, all of

[73] Assignee: International Business Machines Corporation, Armonk, N.Y.

[21] Appl. No.: 834,189

[22] Filed: Feb. 4, 1992

[51] Int. Cl.[5] .......................... H04L 9/28; G06F 15/38
[52] U.S. Cl. .......................................... 380/4; 380/3; 380/23; 380/28; 364/419
[58] Field of Search ................... 380/3, 4, 28, 30, 25, 380/23; 364/419; 395/425

[56] References Cited

U.S. PATENT DOCUMENTS

| | | | |
|---|---|---|---|
| 4,558,176 | 12/1985 | Arnold et al. | 380/4 |
| 4,577,289 | 3/1966 | Comerford et al. | 360/60 |
| 4,658,093 | 4/1987 | Hellman | 380/25 |
| 4,670,857 | 6/1987 | Rackman | 380/4 |
| 4,683,968 | 8/1987 | Appelbaum et al. | 380/4 |
| 4,796,220 | 1/1989 | Wolfe | 380/4 |
| 4,849,836 | 7/1989 | Kachikian | 360/60 |
| 4,858,036 | 8/1989 | Ginkel | 360/60 |
| 4,864,494 | 9/1989 | Kobus, Jr. | 395/575 |
| 4,879,704 | 11/1989 | Takagi et al. | 369/14 |
| 4,924,378 | 5/1990 | Hershey et al. | 380/4 X |
| 4,937,861 | 6/1990 | Cummins | 380/2 |
| 5,010,571 | 4/1991 | Katznelson | 380/4 |
| 5,065,429 | 11/1991 | Lang | 380/4 X |

Primary Examiner—Gilberto Barron, Jr.
Attorney, Agent, or Firm—John E. Hoel

[57] ABSTRACT

A data processing system method and program are disclosed for limiting a book reading program for softcopy books, to be capable of reading only softcopy books published by a selected publisher. The method includes the step of generating with a data processor, a customized polynomial expression to be associated with a selected softcopy book publisher. The method continues by merging with a data processor, the customized polynomial expression with a first shell program, forming a stamping tool program for stamping a key value onto a softcopy book published by the selected publisher. The key value results from the polynomial, using the product of an integer times a hash value of the publisher's identity, as the value of the independent variable. Then the method continues by generating with a data processor, a customized inverse polynomial expression to the customized polynomial expression, to be associated with the selected softcopy book publisher. Finally, the method merges with a data processor, the customized inverse polynomial expression with a second shell program, forming a book validation program for validating the key value on the softcopy book published by the selected publisher and enabling a softcopy book reading program to read the softcopy book.

12 Claims, 29 Drawing Sheets

FIG. 2b

50 — WRITE TO POLYNOMIAL FILE          'Third Degree Polynomial

"C3 = CONST1" : "C0 = CONST2" : "h[PubID] = CONST3"

"X = X * h[PubID]"

"K(X) = C3 * X**3 + C0 + h[Book]"

WRITE TO INVERSE POLYNOMIAL FILE     'Third Degree
                                     'Inverse Polynomial
"C3 = CONST1" : "C0 = CONST2" : "h[PubID] = CONST3"

"F2 = F1 - C0"

"F3 = F2 / C3"

"F4 = Cube_Root ( F3 )"   :GOTO SHELL INSERTION STEP 56

52 — WRITE TO POLYNOMIAL FILE          'Fourth Degree Polynomial

"C4 = CONST1" : "C0 = CONST2" : "h[PubID] = CONST3"

"X = X * h[PubID]"

"K(X) = C4 * X**4 + C0 + h[Book]"

WRITE TO INVERSE POLYNOMIAL FILE     'Fourth Degree
                                     'Inverse Polynomial
"C4 = CONST1" : "C0 = CONST2" : "h[PubID] = CONST3"

"F2 = F1 - C0"

"F3 = F2 / C4"

"F4 = Fourth_Root ( F3 )"   :GOTO SHELL INSERTION STEP 56

54 — WRITE TO POLYNOMIAL FILE          'Fifth Degree Polynomial

"C5 = CONST1" : "C0 = CONST2" : "h[PubID] = CONST3"

"X = X * h[PubID]"

"K(X) = C5 * X**5 + C0 + h[Book]"

WRITE TO INVERSE POLYNOMIAL FILE     'Fifth Degree
                                     'Inverse Polynomial
"C5 = CONST1" : "C0 = CONST2" : "h[PubID] = CONST3"

"F2 = F1 - C0"

"F3 = F2 / C5"

"F4 = Fifth_Root ( F3 )"   :GOTO SHELL INSERTION STEP 56

FIG. 3

Stamping Program Shell 62

```
72  INPUT Book_Name
74  GET FIRST FIVE CHARACTERS OF Book_Name
76  CONVERT ASCII TO VALUES AND COMPUTE SUM
78  h[Book] = SUM MOD 100
82  X = RND * 10000        'RND is a Random number 0 < RND < 1
84  X = INT(X)             'INT(X) is the largest integer < or = X Space Allocated for Customized Polynomial 65
                                  64

92  WRITE K(X) IN BOOKFILE
    END
```

FIG. 4

Book Validation Program Shell 66

| | |
|---|---|
| 102 → | READ Book_Name |
| 104 → | GET FIRST FIVE CHARACTERS OF Book_Name |
| 106 → | CONVERT ASCII TO VALUES AND COMPUTE SUM |
| 108 → | h[Book] = SUM MOD 100 |
| 110 → | READ K(X) |
| 114 → | F1 = K(X) - h[Book] |

Space Allocated for
Customized Inverse Polynomial 69

68

| | | |
|---|---|---|
| 123 → | F4 = Absolute_Value ( F4 ) | |
| 124 → | F5 = F4 / h[PubID] | |
| 126 → | F6 = INT( F5 ) | |
| 128 → | IF F6 = F5 THEN KEY_VALID | 'F5 is an integer, 'therefore K(X) is valid |
| 130 → | GOTO NORMAL BOOK READING PROGRAM | |
| 132 → | IF F6 NOT = F5 THEN INVALID_KEY | 'F5 is not an integer, thus K(X) is invalid |
| 134 → | EXIT BOOK READING PROGRAM | |
| | END | |

FIG. 13

```
Begin Program to Generate Stamping Tool Program      40a

DEGREE  = INT[ RND * 5 + 1 ]         '1 <= DEGREE <= 5, an integer
CONST1 = INT[ RND * 10000 ]          '1 <= CONST1 <= 10000, an integer    42
CONST2 = INT[ RND * 10000 ]          '1 <= CONST2 <= 10000, an integer
```

45 → OUTPUT STAMPING TOOL PROGRAM 70a

```
                STAMPING TOOL PROGRAM 70a

71→  C2 = CONST1 : C0 = CONST2 : h[PubID] = CONST3 : DEGREE = DEGREE
72→  INPUT Book_Name
74→  GET FIRST FIVE CHARACTERS OF Book_Name
76→  CONVERT ASCII TO VALUES AND COMPUTE SUM
78→  h[Book] = SUM MOD 100
82→  X = RND * 10000             'RND is a Random number 0 < RND < 1
84→  X = INT(X)                  'INT(X) is the largest integer < or = X
88→  X = X * h[PubID]
90'→ K(X) = C2 * X**DEGREE + C0 + h[Book]     65  Polynomial
                                                  of degree
92→  WRITE K(X) IN BOOKFILE                       = DEGREE
     END
```

RETURN

DATA PROCESSING SYSTEM AND METHOD TO PRODUCE SOFTCOPY BOOK READERS WHICH ARE LIMITED TO READING ONLY BOOKS PUBLISHED BY A SPECIFIC PUBLISHER

BACKGROUND OF THE INVENTION

1. Technical Field

The invention disclosed broadly relates to data processing and more particularly relates to softcopy book readers.

2. Background Art

Large, softcopy documents have been stored in data processing systems for later retrieval and display. The retrieval of documents using a computer has been a prominent application in both business and library science. However, the presentation of large, softcopy documents for display on a monitor screen, has been in a serial, page-by-page format. The page-by-page presentation has made the on-line review of large, softcopy documents a slow and inefficient operation. To solve this problem of page-by-page presentation, softcopy book reading programs have been devised. For example, the IBM BookManager (TM) READ program helps the user manage, search and look at on-line books. There are two complementary BookManager products, BookManager BUILD creates on-line books from files marked-up with Generalized Markup Language. The BookManager READ product can then manage, search and show the on-line books created by BookManager BUILD. The BookManager READ program product is described in the IBM publication "BookManager (TM) READ/VM, Displaying On-Line Books," publication number SC23-0449-1, September 1990. The BookManager BUILD program product is described in the IBM publication "BookManager (TM) BUILD/VM - Preparing On-Line Books," publication number SC23-0450-1, September 1990. These publications are available from IBM branch offices.

The IBM BookManager READ program is capable of reading any book which has been built by the IBM BookManager BUILD program. It would be useful to have a version of IBM BookManager READ which was limited to reading only those books which are published by a particular speciality publisher. A speciality publisher, for example, a publisher of Shakespearean plays, has a customer set with a limited need for BookManager READ to read only the Shakespearean plays published by that publisher. Another speciality publisher, for example, a publisher of automotive repair manuals, has a clientele with a limited need for BookManager READ to read only automobile repair manuals published by that publisher. However, the owner of a copy of the full function BookManager READ should be permitted to read any softcopy publication prepared by BookManager BUILD, whether it came from the publisher of the Shakespearean plays, or the publisher of the automobile repair manuals, or any publisher of softcopy books which are built using the IBM BookManager BUILD program. By having a limited library BookManager READ program, the speciality publisher can enhance the marketability of his softcopy book product, while the licensor of the full function BookManager READ does not undercut the market for his book reader product.

Further, it would be useful to have a limited library BookManager READ for a speciality publisher, capable of reading not only the first book published by that speciality publisher, but a whole series of books published both currently and in the future by that speciality publisher. It would not be the objective to prevent the softcopy books themselves from being copied, but only to limit the application of the limited library BookManager READ to reading a particular publisher's line of publications. Each respective speciality publisher would then be able to produce softcopy books readable by a low cost version of IBM BookManager READ which is limited to reading only those books published by that publisher. The limited library BookManager READ should be capable of being freely copied by the end user to enable the speciality publisher's books to be read by several persons within the end user's enterprise.

OBJECTS OF THE INVENTION

It is therefore an object of the invention to provide an improved softcopy reading device.

It is another object of the invention to provide an improved softcopy reading device which is limited to reading only those books published by a particular publisher.

It is still a further object of the invention to provide a softcopy reading device which is capable of being copied itself, however which is limited to reading only those books produced by a particular publisher.

It is yet a further object of the invention to provide a softcopy book reading device and method which enables a particular publisher to produce softcopy books in many editions, which are readable by a limited softcopy reader, while preventing the softcopy reader from reading publications produced by any other publisher.

SUMMARY OF THE INVENTION

These and other objects, features and advantages are accomplished by the invention disclosed herein. A data processing system and method are disclosed to produce a softcopy book reader which is limited to reading only books published by a specific publisher. The licensor of the softcopy reader produces a stamping tool program and a book validation program which are customized for a particular speciality publisher.

The stamping tool program includes a customized polynomial which contains information characteristic of the speciality publisher. The book validation program includes a customized inverse polynomial which also contains information characteristic of the speciality publisher.

The speciality publisher uses the stamping tool program to stamp a key into his softcopy book being published, creating a stamped book. The key being stamped into the softcopy book has characteristics derived from the book being stamped and also characteristics derived from the speciality publisher's identity. The stamping tool uses the customized polynomial to produce the key. The speciality publisher then publishes the stamped book for sale to end users.

The book validation program is combined with the full function book reader program, forming a limited book reader program. The limited book reader program can be delivered to end users who will be reading the speciality publisher's publications. Alternately, the limited book reader program can be delivered to the publisher himself, who will incorporate it along with the stamped softcopy book, as a part of the speciality publication offered by the publisher.

The end user will read the stamped softcopy book using the limited book reader program, which will perform a check of the key value stamped in the softcopy book. This is done using the customized inverse polynomial to determine whether the softcopy book is in fact published by the speciality publisher. If the book validation program successfully tests the key based upon the key value and information about the book, then the end user is able to use the book reader program to read the book. If the key does not test correctly, then the book reader program is not enabled.

The end user may have an unlimited version of the book reader program and it is able to read the stamped softcopy book, because it is not required to test and validate the key value stored in the softcopy book.

A second speciality publisher wishing to have his respective library of books stamped for limited library reading will have assigned to him a different customized polynomial and customized inverse polynomial by the licensor of the book reader program. The resulting stamping tool for the second speciality publisher will stamp a key value on books which is incompatible with the first speciality publisher's limited book reader program. In this manner, speciality publishers are enabled to provide low cost, softcopy book readers for their clientele, which are limited to reading only stamped books produced by that particular speciality publisher.

DESCRIPTION OF THE FIGURES

These and other objects, features and advantages of the invention will be more fully appreciated with reference to the accompanying figures.

FIGS. 2A, 2B, 2C. are flow diagrams of the program to generate the customized polynomial and inverse polynomial.

FIG. 3 is an illustration of the stamping tool program shell 62.

FIG. 4 is an illustration of the book validation program shell 66.

FIG. 13 is a flow diagram of an alternate generation program 40a to generate an alternate stamping tool program 70a.

FIG. 14 is an alternate generation program 40b to generate an alternate book validation program 100a.

FIG. 15A is the customized exponential function 65a and FIG. 15B is the customized inverse exponential function 69a.

DISCUSSION OF THE PREFERRED EMBODIMENT

The above referenced IBM publications describing BookManager BUILD and BookManager READ program products, describe the principles of operation of a softcopy book reading program whose presentation format primarily displays on a monitor display screen. Additional background description of the BookManager product can be found in the following IBM patent applications:

Abandoned U.S. patent application Ser. No. 317,248, filed Feb. 20, 1989, now abandoned, entitled "A Method for Displaying On-Line Information," by E. Cassorla, et al., assigned to the IBM Corporation and incorporated herein by reference.

Copending U.S. patent application Ser. No. 486,461, filed Feb. 28, 1990 now U.S. Pat. No. 5,146,552, entitled "a Method for Associating Annotation With Electronic Books," by J. DeVries, et al., assigned to the IBM Corporation and incorporated herein by reference.

Copending U.S. patent application Ser. No. 546,334, filed Jun. 29, 1990, entitled "Structured Document Tags Invoking Specialized Functions," by N. Sabia, et al., assigned to the IBM Corporation and incorporated herein by reference.

Copending U.S. patent application Ser. No. 755,709, filed Sep. 6, 1991 entitled "A Data Processing Method to Provide a Generalized Link From a Reference Point in an On-Line Book to a Arbitrary Multimedia Object Which Can be Dynamically Updated," by A. Cutlip Cohen, et al., assigned to the IBM Corporation and incorporated herein by reference.

The BookManager BUILD and BookManager READ program products use on-line, softcopy books which are formatted using a Generalized Markup Language (GML), such as the language described in the following two IBM publications:

"IBM BookMaster — Text Programmers Notebook — Release 3.0," publication number SC34-5012-02, September 1990 and "IBM BookMaster — Users Guide — Release 3.0," publication number SC34-5009-03, September 1990. Both of these IBM BookMaster publications are available through IBM branch offices.

Figure 1:
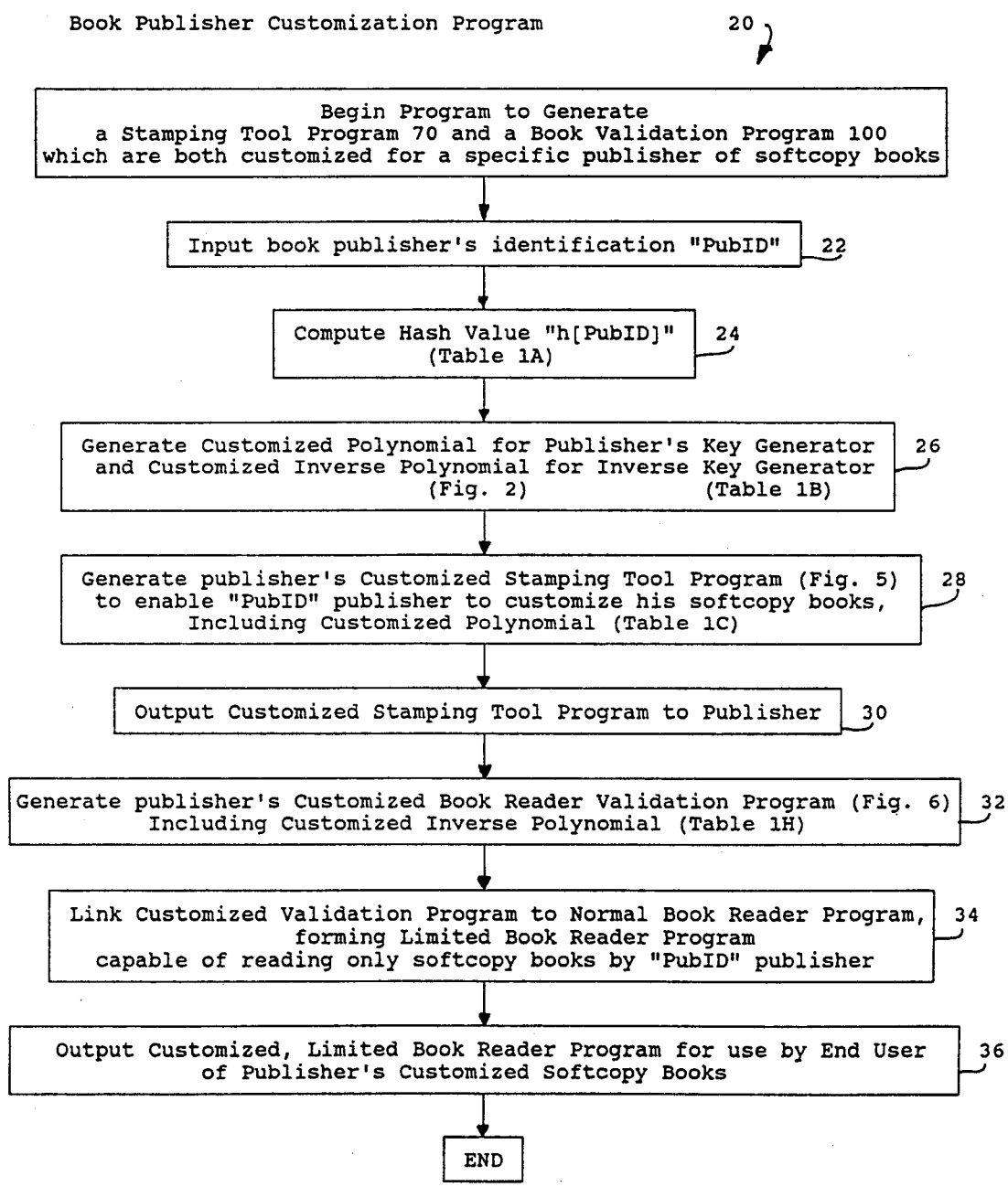
FIG. 1 is a flow diagram of the book publisher customization program.
Figure 7:
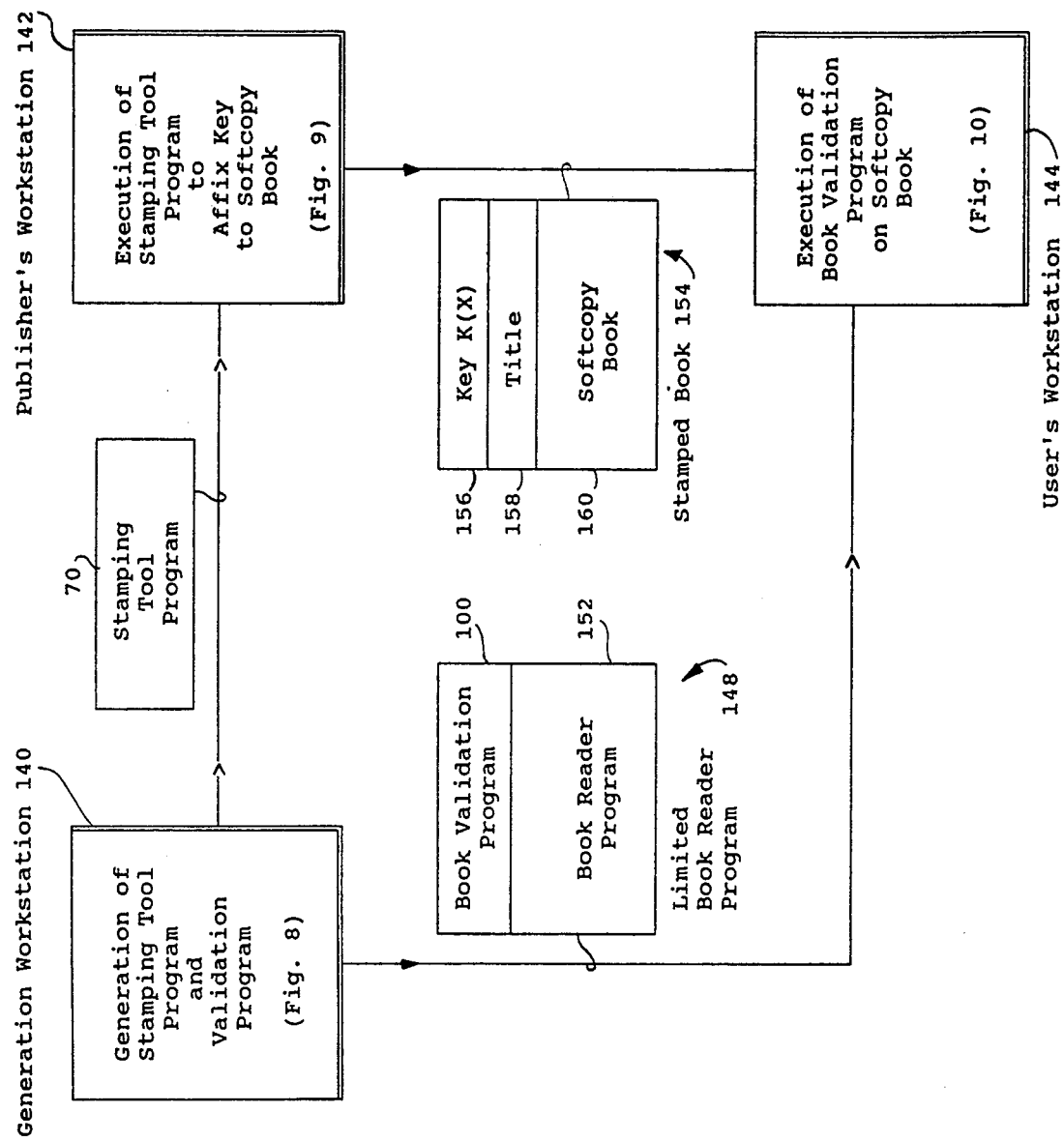
FIG. 7 is a data flow diagram illustrating the routing of the stamper program, the limited book reader program, and the keyed book.

FIG. 1 shows the publisher customization program which is characterized as the overall method for generating a stamping tool program and a book validation program at the generation workstation 140 in FIG. 7. The method of FIG. 1 also shows the distribution of the stamping tool program 70 and the limited book reader program 148. In FIG. 1, the computer program embodying method 20 begins by inputting the book publisher's identification "PubID" in step 22. Then in step 24, a hash value h[PubID] is computed. This hash value can be computed in a variety of ways, one way of which is illustrated in Table 1A. For example, if publisher A has a name "Shakespeare Library Publishers, Inc.," one simple hashing technique is to isolate the first five characters in the name of the publisher, in this case, the five alpha characters "Shake," and to compute the sum of their ASCII code values. The sum of the five ASCII code values can then be taken modulo 100 to provide a hashed value. For example, the sum of the ASCII characters for "Shake" is 492 taken modulo 100 is 92, which is the value for the hashed publisher identification h[PubID]. The constant CONST3 is set equal to h[PubID].

Figure 2A:
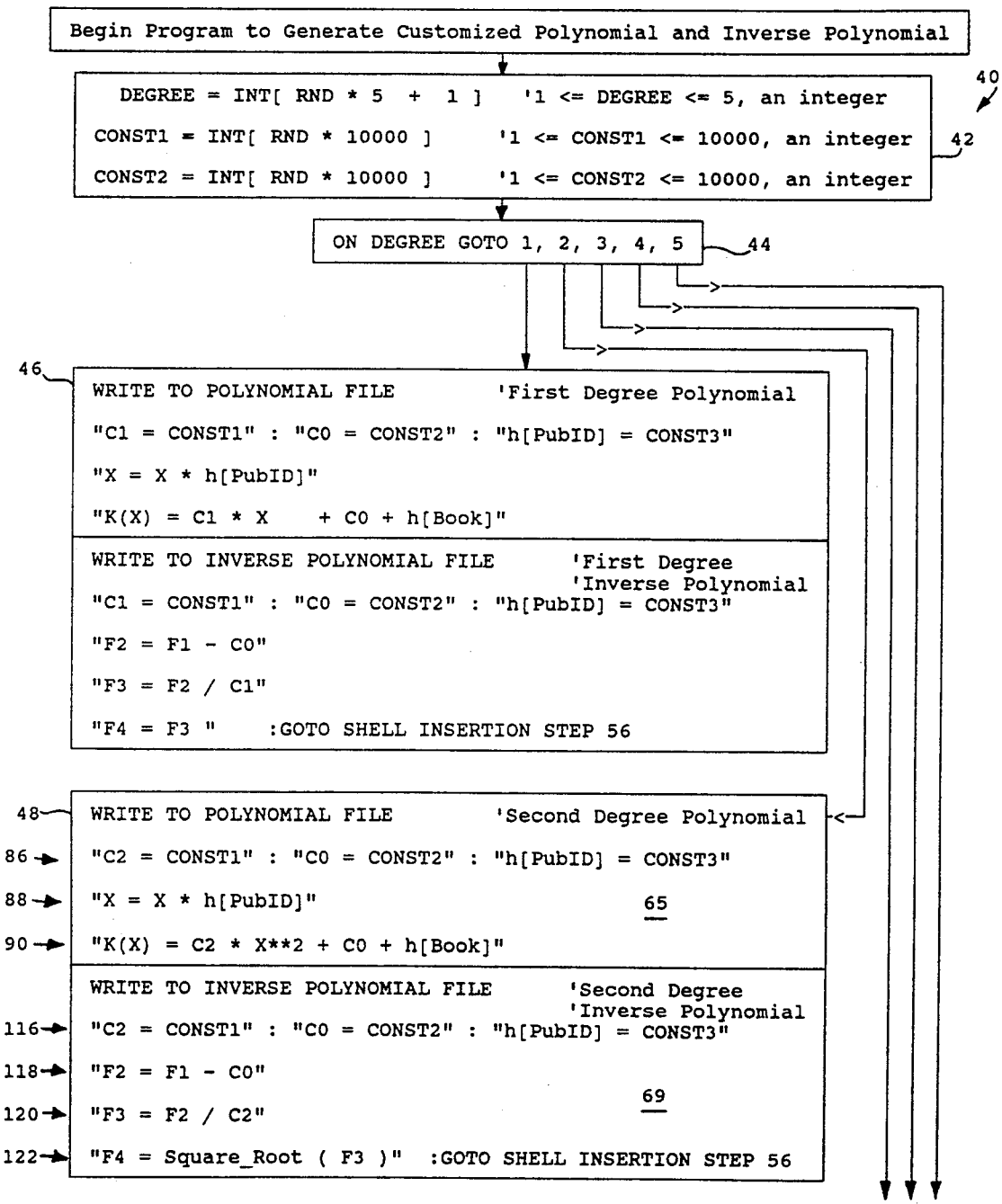
Figure 2C:
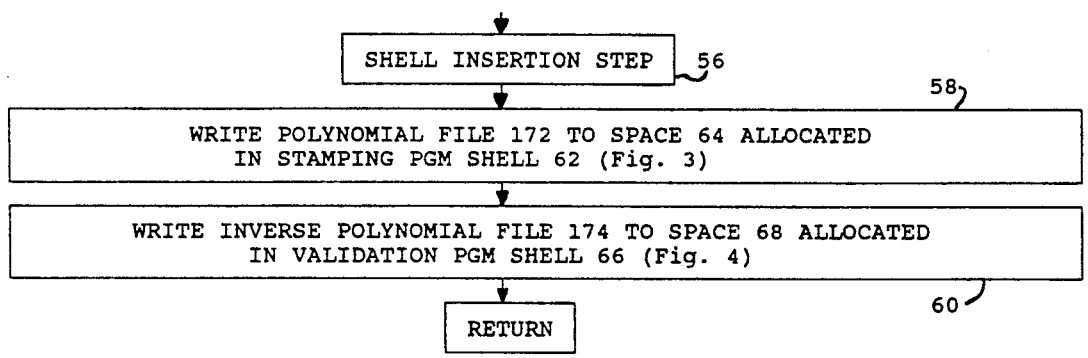

Then in the flow diagram of FIG. 1, step 26 generates the customized polynomial for the publisher's key generator and the customized inverse polynomial for the inverse key generator. The program to generate the customized polynomial and inverse polynomial is shown in FIG. 2. The program 40 of FIG. 2 starts with step 42 which computes values for the constant "DEGREE," "CONST1," and "CONST2." These computations are illustrated in Table 1B. The constant "DEGREE" represents the degree of the polynomial which is desired to be used as the customizing polynomial. As is shown in Table 1B, the function "RND" is a random number generator function which generates a pseudorandom number having a value greater than zero and less than one. By multiplying RND times five, and adding one, a random number is generated which is greater than one and less than six. The function "INT" operating on an argument, computes the largest integer not greater than the argument. Thus, if the result of computing the value for "DEGREE" is applied as the argument of "INT," the result is the largest integer not greater than "DEGREE." If the random number computation generated a value of 2.134 for DEGREE, then the largest integer not greater than that value is 2. DEGREE is set equal to 2. This means that a second degree polynomial will be used as the customized polynomial and a second degree inverse polynomial will be used as the inverse polynomial in the program 40 of FIG. 2.

The values for CONST1 and CONST2 are also computed as random numbers, and turned into integers. As is shown in step 42 and in Table 1B, CONST1 is set equal to the largest integer not greater than the product of the random number generated by RND times 10,000. In the example of Table 1B, RND times 10,000 equals 103.34. The largest integer not greater than that value is 103 and that is the value to which the constant CONST1 is set equal. The constant CONST2 is computed in a similar manner and is shown in Table 1B, RND times 10,000 is equal to 88.29 and the largest integer not greater than that value is 88. CONST2 is set equal to the value of 88 in step 42 in FIG. 2.

Step 44 is a computed GOTO statement where the value of the variable "DEGREE" is evaluated as being either one, two, three, four or five and a separate address is jumped-to from step 44, depending on that value. If DEGREE were equal to one, then the program jumps to module 46 which is a first degree polynomial module. If the value of DEGREE were equal to two, then the program jumps to module 48 which is a second degree polynomial module. If the value of DEGREE is equal to three, then the program jumps to step 50 which is a third degree polynomial module. If the value of DEGREE is equal to four, then the program jumps to module 52 which is a fourth degree polynomial module. If the value of DEGREE is equal to five, then the program jumps to step 54 which is a fifth degree polynomial module.

One can see that the principle can be generalized to a Taylor series expansion which has as many terms as one finds necessary to replicate a particular function. The polynomial function desired to be used in the program 40 of FIG. 2, need only have the property that there is a one-to-one relationship between the independent variable X and the dependent variable F(X), where F(X) is equal to the Taylor series expansion. There is a great variety of polynomials which will provide this behavior. For ease of computing an inverse polynomial, only those polynomials are shown in the examples herein, which are first, second, third, fourth or fifth degree polynomials which have two terms, a first term having a coefficient times $X^{nth}$ and a second term which is a constant. In this manner, an inverse polynomial can be easily shown in the example. However, other polynomials having more complex behavior and additional terms can also be used, in accordance with the invention.

In this example, since the value of "DEGREE" is equal to two, the computed GOTO step 44 will have the program jump to the module 48, which is the second degree polynomial module. The module 48 includes a polynomial portion 65 and an inverse polynomial portion 69. The contents of the polynomial portion 65 are written to a polynomial file 172 shown in the generation workstation 140 of FIG. 8. The contents of the inverse polynomial portion 69 are written to the inverse polynomial file 174 in the generation workstation 140 of FIG. 8. The polynomial portion 65 of FIG. 2 includes line 86 which provides the values of C2=CONST1, C0=CONST2, and the hashed value of the publisher's ID, h[PubID]=CONST3. Line 88 provides the expression X=X times h[PubID] and line 90 provides the expression of the polynomial itself plus the constant representing the hash value for the book, K(X)=C2 times X**2+C0+h[Book]. The literal expressions for these relationships are written into the polynomial file 172.

Similarly, the contents of the inverse polynomial portion 69 are four literal lines which are written into the inverse polynomial file 174. Line 116 is the same as line 86, line 118 is F2=F1-C0. Line 120 is F3=F2/C2, and line 122 is F4 equals the square root of (3). These literal expressions are written into the inverse polynomial file 174.

After the operations of writing to the polynomial file and inverse polynomial file are completed for the module 48, the program goes to the shell insertion step 56. This corresponds to step 28 of FIG. 1. The shell insertion step 56 has step 58 wherein the polynomial file 172 is written to the space 64 allocated in the stamping program shell 62 shown in FIG. 3.

Figure 5A:
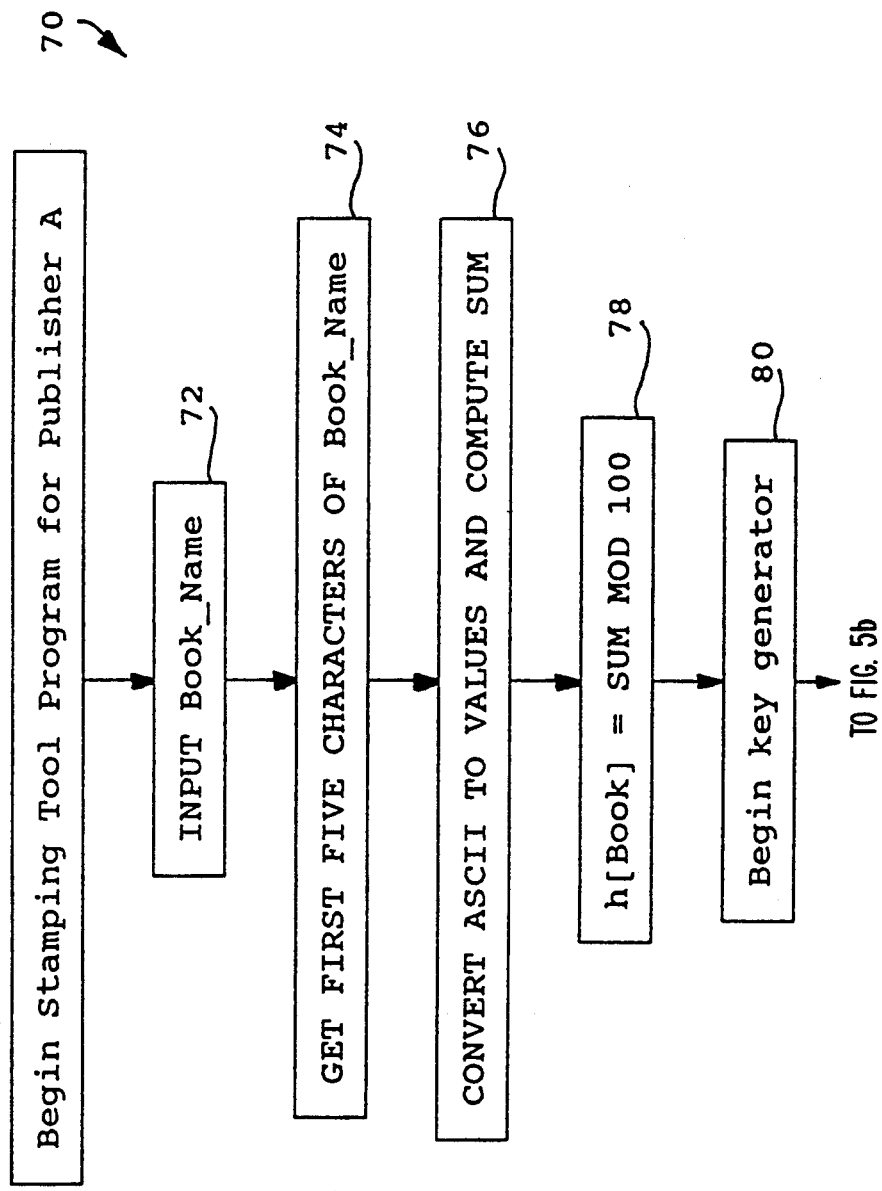
FIGS. 5A and 5B are flow diagrams of the stamping tool program.
Figure 5B:
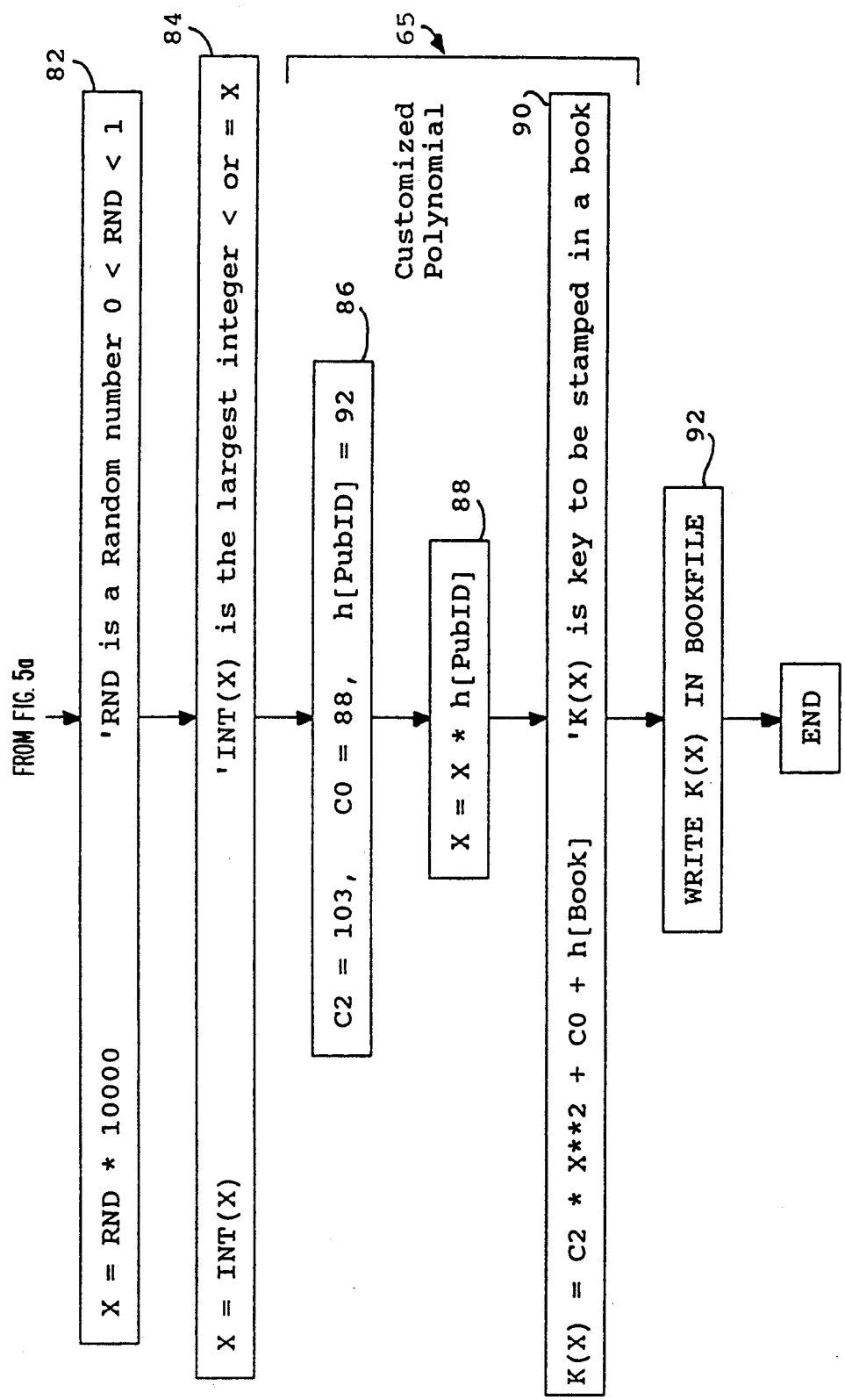

FIG. 3 shows the stamping program shell 62 which includes a number of lines of program code and a space 64 allocated for the customized polynomial 65 which has been written into the polynomial file 172. In the stamping program shell 62 of FIG. 3, lines 72, 74, 76, 78, 82 and 84 are lines of program code which will be used in the stamping tool program 70. Line 92 will then follow the space 64 and will also be included in the stamping tool program 70 which results from the operation of program 40 of FIG. 2. The result of writing the polynomial file 172 into the space 64 of the stamping program shell 62 is the stamping tool program 70 which is shown in flow diagram form in FIG. 5 and in list form in Table 1C. The stamping tool program of FIG. 5 shows the lines 72, 74, 76, 78 and 82 and 84 which are provided by the stamping program shell 62 of FIG. 3. The stamping tool program of FIG. 5 also shows the customized polynomial 65 which includes lines 86, 88 and 90 which came from the module 48 of the generation program of FIG. 2, via the polynomial file 172. The stamping tool program 70 of FIG. 5 also shows the last line 92 following the customized polynomial 65. Thus, it is seen that at line 58 of program 40 in FIG. 2, the stamping tool program 70 is assembled as shown in Table 1C, with the customized polynomial for a particular speciality publisher. Step 30 of FIG. 1 then outputs the stamping tool program 70 to the publisher.

The generation program 40 of FIG. 2 then transfers to step 60 which writes the inverse polynomial file 174 to the space 68 allocated in the book validation program shell 66 of FIG. 4. As can be seen in FIG. 4, the book validation program shell 66 includes existing code lines 102, 104, 106, 108, 110 and 114, followed by a space 68 which is allocated for the customized inverse polynomial 69. This space is then followed by additional code lines 123, 124, 126, 128, 130, 132 and 134. In the program 40 of FIG. 2, step 60 writes the inverse polynomial file 174, which includes lines 116, 118, 120 and 122 from the module 48 of FIG. 2, into the space 68 allocated for the customized inverse polynomial 69, in the book validation program shell 66. As a result of the operation of step 60 of FIG. 2, the book validation program module 100 is completed as is shown in the flow diagram of FIG. 6 and as shown in list form in Table 1H. It is seen in the flow diagram of FIG. 6 that the steps 102, 104, 106, 108, 110, 112, 114 are present and came from the book validation program shell 66 of FIG. 4. It is also seen that customized inverse polynomial 69 made up of steps 116, 118, 120 and 122 are also present in the flow diagram of FIG. 6 and they came from the module 48, via the inverse polynomial file 174. Then, as can be seen in the program 100 of FIG. 6, the customized inverse polynomial 69 is followed by steps 123, 124, 126, 128, 130, 132 and 134 which came from the book validation program shell 66 of FIG. 4. Thus, it is seen that as a result of step 60 in the program 40 of FIG. 2, book validation program module 100 is assembled. This corresponds to step 32 of FIG. 1. The book validation program 100 is customized for a particular specialty publisher.

Figure 8:
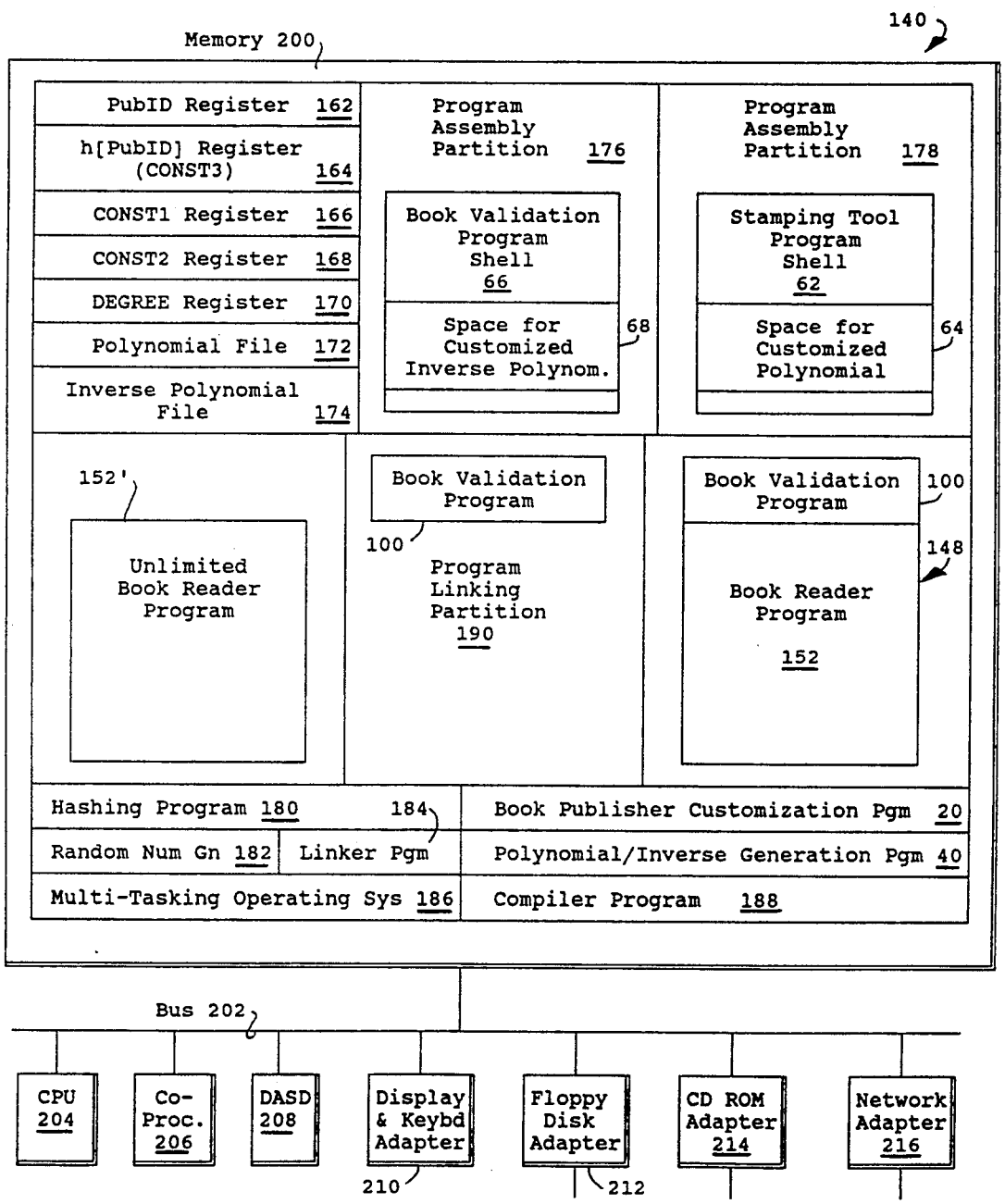
FIG. 8 is a functional block diagram of the program generation workstation at the licensor's location, which generates the stamping tool program and the book validation program.

Then in step 34 of FIG. 1, the customized book validation program 100 is linked to the normal book reader program 152 by means of a linker program 184 in the generation workstation 140 of FIG. 8. The linking of the unlimited book reader program 152' with the book validation program 100 forming the limited book reader program 148, is best illustrated by referring to FIGS. 12A and 12B.

Figure 12A:
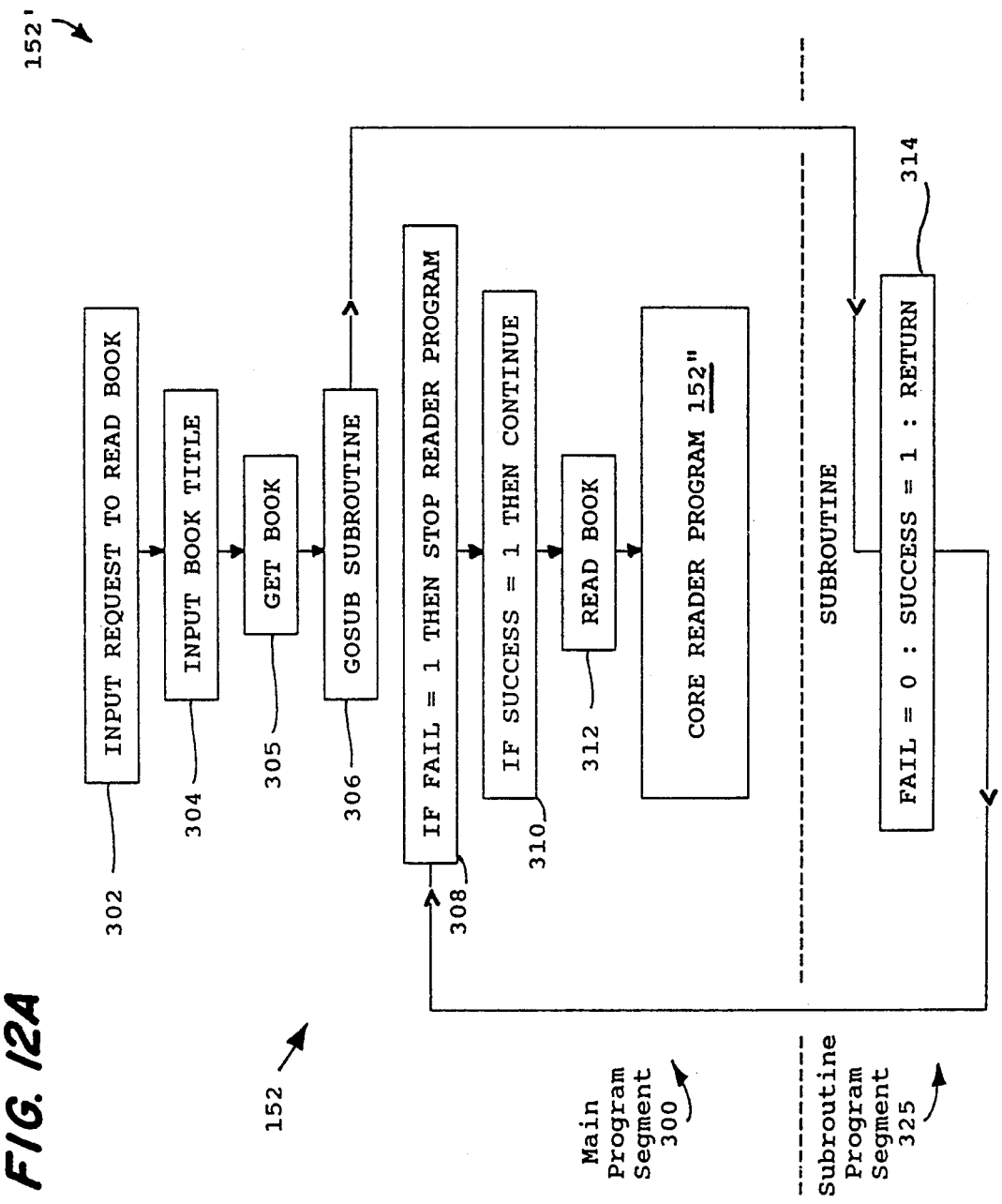
FIG. 12A is a flow diagram of the unlimited book reader program 152'.

FIG. 12A shows a flow diagram of the unlimited book reader program 152'. The unlimited book reader program 152' is composed of a main program segment 300 which contains the book reader program 152, and the subroutine program segment 325 which contains a single subroutine step 314. The unlimited book reader program 152' starts with step 302 where the user inputs a request to read a book. Then, in step 304, the user inputs the book title requested. In step 305, the program gets the softcopy book and in step 306, the program goes to the subroutine program segment 325. In the subroutine program segment 325, step 314 sets the constant "FAIL" equal to zero and sets the constant "SUCCESS" equal to one, and then returns to the main program segment 300. Then, the main program segment 300 does a test in step 308 to determine if the constant "FAIL" equals one, and if it does, then the reader program is stopped. If the constant "FAIL" is not equal to one, then the program goes to step 310 where the constant "SUCCESS" is tested to see if it is equal to one. If the constant "SUCCESS" is equal to one, then the program continues to step 312 to read the book, by proceeding to the core reader program 152".

Figure 12B:
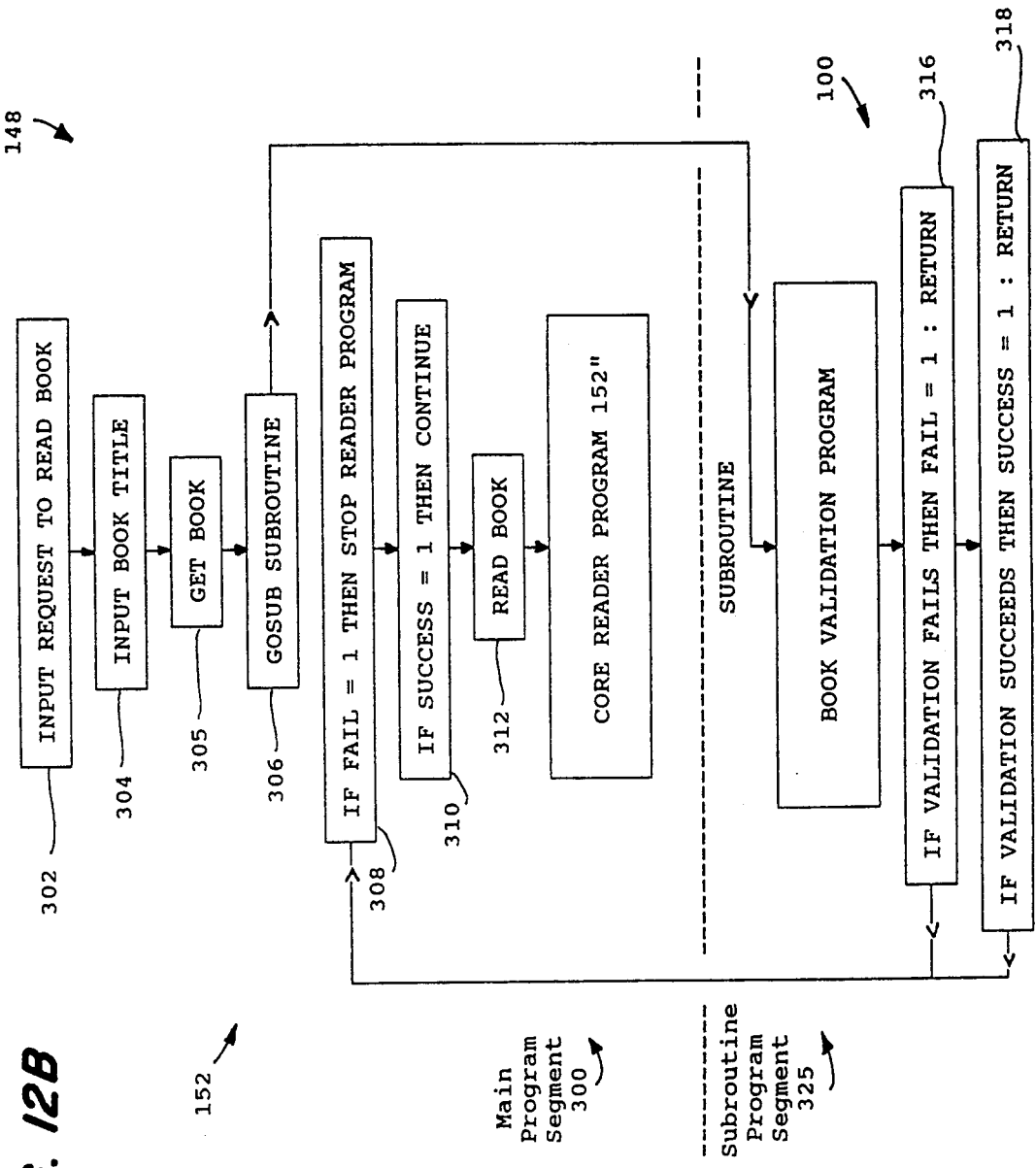
FIG. 12B is a flow diagram of the limited book reader program 148.

The limited book reader program 148 shown in FIG. 12B, has the same book reader program 152 occupying the main program segment 300, as that shown for the unlimited book reader program of FIG. 12A. However, the limited book reader 148 of FIG. 12B has a different subroutine in the subroutine program segment 325, namely the book validation program 100. The book validation program 100, which includes the steps 316 and 318, is overlaid in the subroutine program segment 325 of the limited book reader program 148 of FIG. 12B.

In operation, the limited book reader 148 of FIG. 12B starts with step 302 where the user inputs a request to read a book. Then in step 304, the user inputs the title of the book. Then in step 305, the program gets the softcopy book and in step 306, the program jumps to the subroutine program segment 325. In FIG. 12B, the subroutine program segment 325 begins with the book validation program 100, which is shown in greater detail in FIG. 6, previously described. The book validation program 100 includes step 316, which sets the constant "FAIL" equal to one if the validation fails, and returns to the main program segment 300. If the operation of the book validation program 100 results in the validation of the book succeeding, then the constant "SUCCESS" is set equal to one in step 318 and the program returns to the main program segment 300. Then in step 308 of the limited book reader program 148 of FIG. 12B, if the constant "FAIL" is equal to one, then the reader program is stopped. If the constant "FAIL" is not equal to one, then the program flows to step 310, which determines if the constant "SUCCESS" is equal to one. If the constant "SUCCESS" is equal to one, then the program continues to step 312, which reads the book, the program flowing to the core reader program 152".

It is seen that in the unlimited book reader program 152' of FIG. 12A, the book will always be read because the constant "FAIL" is always set equal to zero and the constant "SUCCESS" is always set equal to one.

However, it is seen that in the limited book reader program 148 of FIG. 12B, that if the key value stamped in the softcopy book does not satisfy the book validation program 100, then the constant "FAIL" will be set equal to one and the book reader program will be stopped in step 308. Alternately, if the key value stamped in the softcopy book evaluated by the book validation program 100 passes the validation test, then the constant "FAIL" will be equal to zero and the constant "SUCCESS" will be equal to one, thereby enabling the core reader program 152" to read the softcopy book.

The overlay of the book validation program 100 into the subroutine program segment 325 of the limited book reader program 148 of FIG. 12B, is carried out by the linker program 184 in the generation workstation 140. The source code represented by the flow diagram for the limited book reader program 148 in FIG. 12B, is then recompiled into object code using a compiler program 188 in the workstation 140 in FIG. 8.

The resulting limited book reader program is capable of reading only softcopy books published by the publisher having the identification PubID. Then, in step 36 of FIG. 1, the customized limited book reader program 148 is transferred to the end user who will be reading the publisher's customized softcopy books.

As can be seen from the data flow diagram of FIG. 7, the generation workstation 140, as is shown in FIG. 8, has produced a stamping tool program 70 and has also produced a book validation program 100 from information about the speciality publisher, by assigning to that speciality publisher a customized polynomial and a customized inverse polynomial. The customized polynomial can be represented for example as the graph line 270 of FIG. 11.

The limited book reader program 148 may be directly transferred from the licensor operating the generation workstation 140 to the end user's workstation 144, as shown in FIG. 7. Alternately, the limited book reader program 148 can be incorporated by the publisher's workstation 142 into a medium which also stores the particular stamped book 154 which the publisher is distributing to the end user.

The stamping tool program 70 itself, is shown in FIG. 5 and in Table 1C. It includes input step 72 to input the book name. The publisher executing the stamping tool program 70 at the publisher's workstation 142 desires to characterize each respective edition of a book to be published by him and to affix into the book a special key unique to that book and to the publisher, to enable his end users to read the book using the corresponding limited book reader program 148.

Referring to Table 1D, an example is given for processing a particular book published publisher A. Recall that publisher A is the Shakespeare Library Publishers, Inc., and a first book published by publisher A can be Hamlet, for example. Steps 74, 76 and 78 of the stamping tool program 70, provide an example hashing function for characterizing the book being published by the publisher. The hashing function shown in this example is a simple hashing function, but many others could be chosen. Hashing function demonstrated in Table 1D takes the first five characters of the title of the book Hamlet, namely "Hamle" and sums the ASCII values of those characters. In this case, the sum of the five ASCII characters is 487. Then the sum is taken modulo 100 to obtain hashed value, in this case 487 modulo 100 is 87, which is set equal to hashed value h[Book]. This is the result of steps 72, 74, 76 and 78 of the flow diagram 70 of FIG. 5. Then step 80 of FIG. 5 begins the key generator operation, with step 82 computing a random number between 1 and 10,000, for example. The integer value of that random number is computed in step 84. This operation can be shown for example in Table 1E where the random number generator function RND times 10,000 gives a value of 3.34. The integer value is 3 to which the variable X is set equal.

Then the flow diagram 70 of FIG. 5 begins the customized polynomial 65 as represented by steps 86, 83 and 90. Step 86 provides that the value of the constant C2 is 103, and the value of the constant C0 is 88 from Table 1B. The value of the publisher's hashed identification h[PubID]=92 from Table 1A. Then in step 88, the value of X which is the integer 3 in Table 1E, is multiplied times the hashed value of the publisher's ID h[PubID], obtaining a new value for X of 276. The value of 276 is assigned to the independent variable X in the polynomial $F(X) = C2$ times $X**2 + C0$. The key value $K(X)$ is equal to the polynomial $F(X)$ plus the hashed value for the book h[Book], and this is computed in Table 1E to have the value of 7846303. This is the numerical value of the key 156 which is to be stamped into this particular softcopy book 160 of Hamlet produced and published by this particular publisher, Shakespeare Library Publishers, Inc. Then in the final step 92 of the flow diagram 70 of FIG. 5, the value of the key $K(X)$ is written into the book file forming the stamped book 154, as is shown for example in FIG. 7. The softcopy book 160 and its title 158 have augmented to it the key value 156, resulting in the stamped book 154. As is seen in FIG. 7, after the publisher's workstation 142 has completed the execution of the stamping tool program 70, affixing the key 156 to the softcopy book 160 resulting in the stamped book 154, the stamped book 154 is transferred to the user's workstation 144 where the user can read it with the limited book reader program 148.

The stamping tool program 70 can be used at the publisher's workstation 142 to carry out the stamping of additional books. An example of this is shown in Table 1F where a second book Romeo and Juliet is being prepared by publisher A for publication. It is seen in Table 1F that a different hashed value h[Book] is computed for this new book, and its value is 14. Table 1G shows the computation of the key $K(X)$ is performed for the second book resulting in a new different value for a key, namely 42717910. In accordance with the invention, both of these values for key 156 will satisfy the checking done by book validation program 100, produced in accordance with the invention for this publisher A.

Figure 6A:
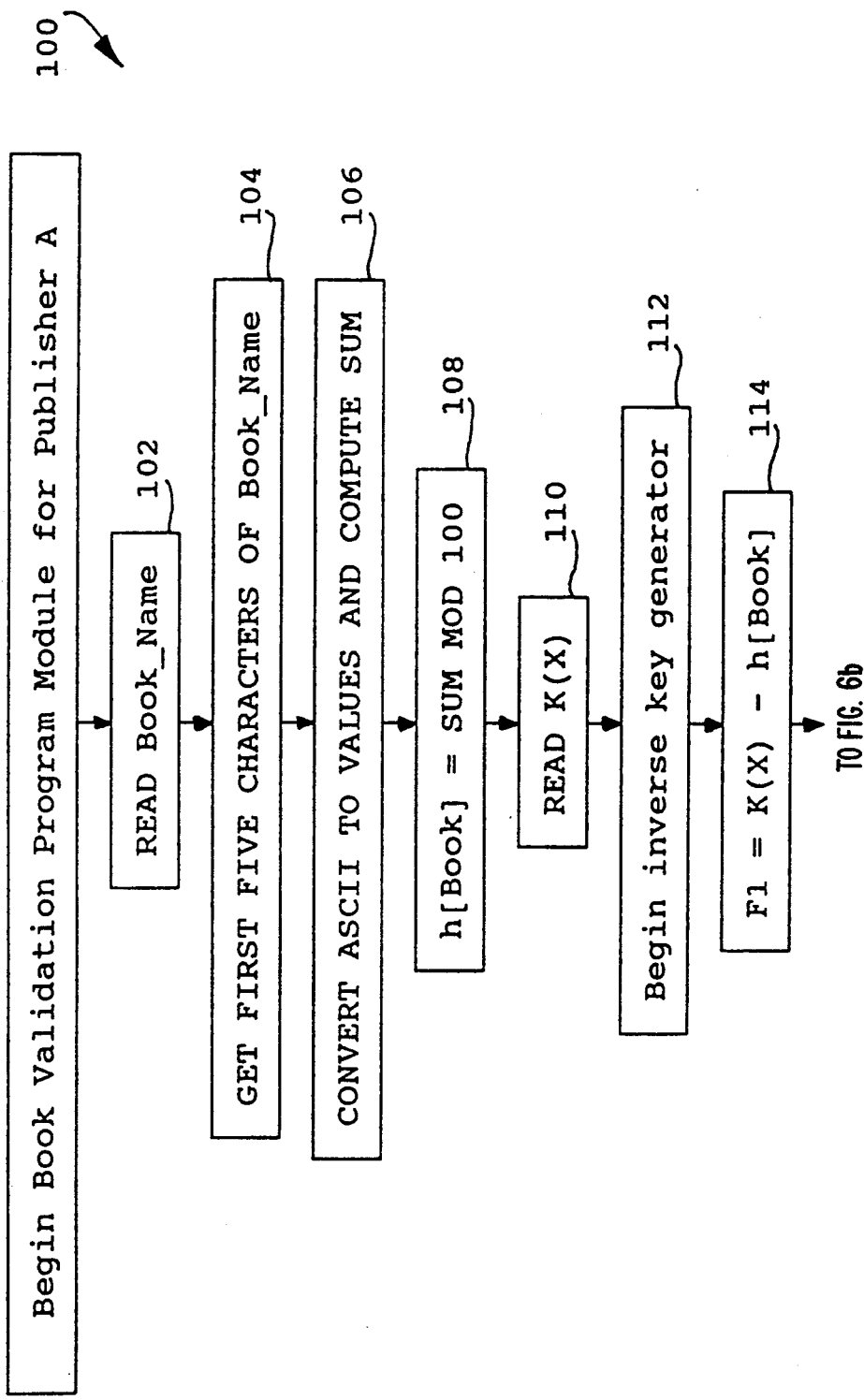
FIGS. 6A and 6B are flow diagrams of the book validation program.
Figure 6B:
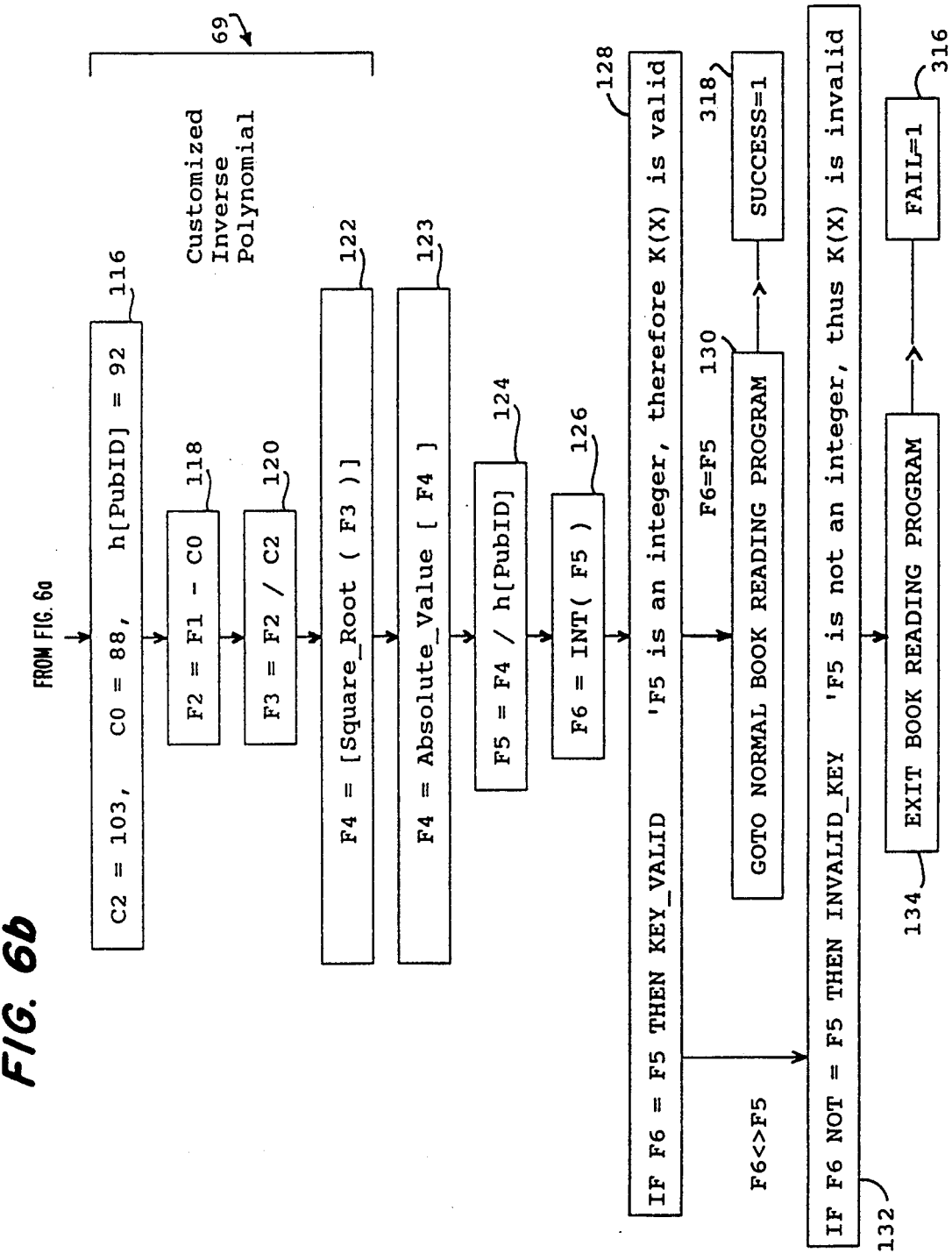

Turning now to the book validation program 100 of FIG. 6, step 102 is carried out at the user's workstation 144, where the book validation program is executed. Step 102 reads the name of the book and if this is publisher A's first book of Hamlet, the book validation program reads the title of the book Hamlet. Then in steps 104, 106 and 108 a hashing function is performed on the book title. The hashing function could use more than just the book title, prearranged portions of the text of the book or other data characteristic of a book can be used to generate a hash value which characterizes the book. The simple example chosen for illustration herein is the taking of the first five characters of the book name, in this case for Hamlet, it would be "Hamle," and converting those characters to their ASCII values and then summing the ASCII values. In Table 1I, this is illustrated, with the sum of the ASCII values being equal to 487. Then the hashed value is computed by taking the sum modulo 100 and that would be 487 modulo 100 which is 87. The constant h[Book] is set equal to 87. This will be the hashed value characterizing this particular book.

In step 110 of flow diagram of FIG. 6, the key value $K(X)$ is read from the softcopy book. The value of key 156 is extracted from the stamped book 154 and the inverse key generator process 112 begins. In step 114 of the flow diagram 100 of FIG. 6, the first step in evaluating the inverse polynomial is to compute F1 which is equal to the value of K(X) minus the hashed value of the book h[Book]. In Table 1I, this computation is performed as shown. Then, the customized inverse polynomial 69 begins in FIG. 6, with step 116 providing the values for the constant C2=103, C0=88, and hashed publisher ID, h[PubID]=92. Then in step 118, the constant F2 is set equal to F1 minus the constant C0. Then in step 120, the value of F3 is set equal to the value of F2 divided by the constant C2. These computations are shown in Table 1I. Then in step 122, since this is a second degree inverse polynomial, F4 is set equal to the square root of F3. This constitutes the customized inverse polynomial 69, which produces the value of F4.

Then in step 123 of the flow diagram 100 of FIG. 6, the absolute value of F4 is taken and then in step 124, F4 is then divided by the value of the hashed publisher's ID, h[PubID]. If the key value K(X) is a valid key value for this particular book validation program 100, then F5 should be an integer. In order to test whether F5 is an integer, step 126 performs an integer operation where the INT function uses as its argument F5, producing the integer value F6. Then in step 128, a comparison is made whether F6=F5. If F6=F5, then the comparison is satisfied which means that F5 is an integer, which indicates that K(X) is a valid key 156 for this validation program 100. If K(X) is a valid key, then step 128 branches to step 130 where the program goes to the book reader program 152. The constant "SUCCESS" is set equal to one in step 318, enabling the end user to read the softcopy stamped book 154 at the user's workstation 144. In the alternative, if K(X) is not valid, then the value of F5 is not an integer. Then step 128 branches to step 132 and since F6 will not equal F5, step 134 exits the program from the system. The constant "FAIL" is set equal to one in step 316, preventing the softcopy book from being read by the book reader program 152.

FIG. 8 is a functional block diagram of the program generation workstation 140. The workstation is organized around the bus 202 which connects the memory 200 to the CPU 204, an optional co-processor 206, the DASD 208, the display and keyboard adapter 210, a floppy disk adapter 212, a CD-ROM adapter 214, and a network adapter 216. The network adapter 216 may be connected over the network to the publisher's workstation 142 and also optionally to the user's workstation 144, for particular applications.

The memory 200 contains executable program code and contains registers, files and partitions to enable the carrying out of the program 20 of FIG. 1 and program 40 of FIG. 2 for the generation of the stamping tool program 70 and for the generation of the book validation program 100 and further for the formation of the limited book reader program 148 which combines the book validation program 100 and the book reader program 152. The memory 200 includes the publisher ID, PubID register 162, the hashed value h[PubID] register 164, which contains the value of CONST3. The memory also includes the CONST1 register 166, the CONST2 register 168, the DEGREE register 170, the polynomial file 172 and the inverse polynomial file 174. Also included is a program assembly partition 176 which includes the book validation program shell 66 and has the empty space 68 available for the customized inverse polynomial. The memory 200 also includes a program assembly partition 178 which has the stamping tool program shell 62 which includes the space available 64 for the customized polynomial. The memory 200 also includes a partition for the unlimited book reader program 152', which can be for example the IBM BookManager READ/2 or READ/DOS. Also, the memory 200 includes a program linking partition 190 in which the book validation program 100 will be linked to the unlimited book reader program 152', thereby forming the limited book reader program 148, also shown in a separate partition in the memory 200. Memory 200 also can contain a hashing program 180, a random number generator 182, a linker program 184, a multi-tasking operating system 186. The memory 200 can also contain a compiler program 188. The memory 200 contains the polynomial/inverse polynomial generation program 40 and the book publisher customization program 20. The programs in the memory 200 are executable code, whose statements are executed by the CPU 204 to perform the sequence of operational steps as shown in the flow diagrams of FIG. 1 and FIG. 2, thereby producing the stamping tool program 70 and the limited book reader program 148.

Figure 9:
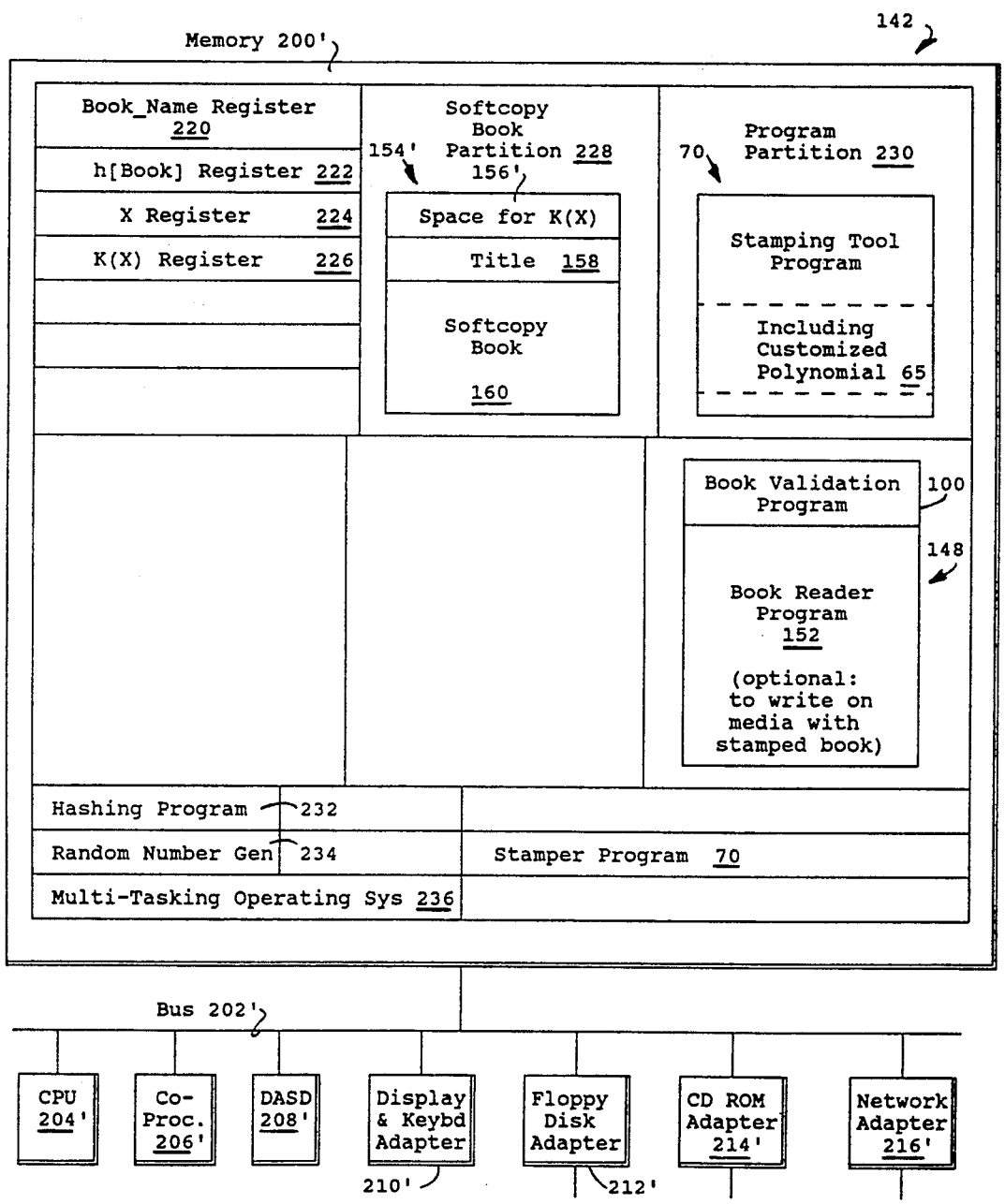
FIG. 9 is a functional block diagram of the publisher's workstation which executes the stamping tool program to affix the key to a softcopy book.

FIG. 9 is a functional diagram of the publisher's workstation 142. The publisher's workstation 142 is organized around the bus 202' which connects the memory 200' to the CPU 204', an optional co-processor 206', a DASD 208', a display and keyboard adapter 210', a floppy disk adapter 212', a CD-ROM adapter 214', and a network adapter 216'. The network adapter 216' can be connected over a suitable data communications network to the generation workstation 140, for receiving a copy of the stamping tool program 70 which may be transmitted from the generation workstation 140 to the publisher's workstation 142.

The memory 200' of the publisher's workstation 142 contains a number of registers, files, and partitions and also includes programs for executing the stamping tool program. A book name register 220 is included in the memory 200', also included is the h[Book] register 222, the X register 224, the key K(X) register 226. Also included, is a softcopy book partition 228 which includes a copy 154' of the softcopy book which has the softcopy book portion 160, and the title 158, and an empty space 156' available for the key K(X). Also included is a program partition 230, which includes the stamping tool program 70, which contains the customized polynomial 65 for this particular publisher. Also, as an option, a copy of the limited book reader program 148 may also be included in the memory 200', if the publisher chooses to write a copy of the limited book reader program 148 onto the medium which will also contain a copy of the stamped book 154. The memory 200' also includes the hashing program 232, the random number generator 234, the multi-tasking operating system 236, and the stamping tool program 70. The programs contained in the memory 200', are executable code whose statements are executed on the CPU 204' to carry out the stamping tool program 70, the execution of which will affix the key K(X) to the softcopy book thereby producing the stamped book 154.

Figure 10:
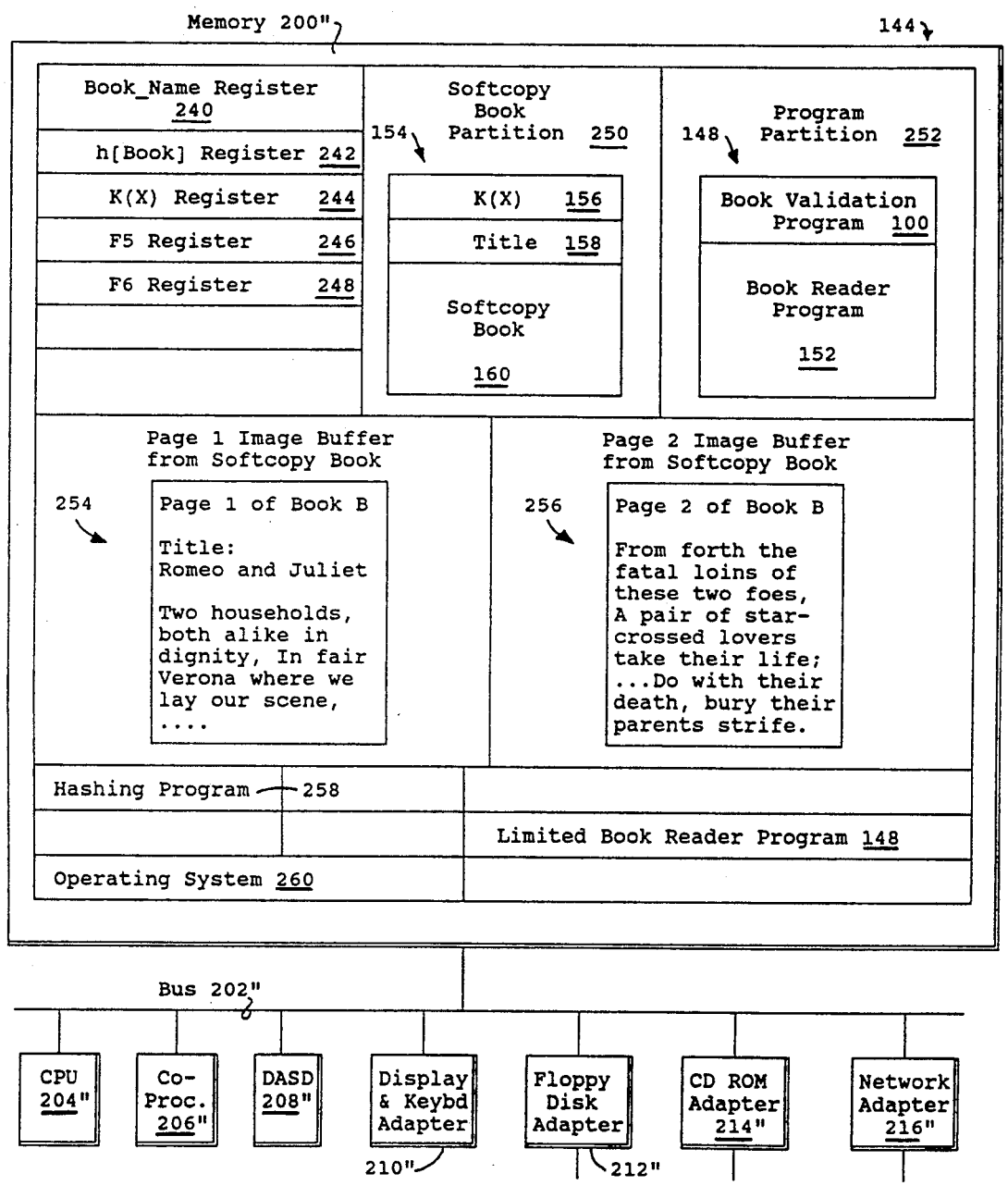
FIG. 10 is a functional block diagram of the end user's workstation where the book validation program is executed on a softcopy book to determine whether it is a valid book which can be read by the limited book reader program.

FIG. 10 is an architectural diagram of the end user's workstation 144. The end user's workstation 144 is organized around the bus 202", which connects the memory 200" to the CPU 204", the optional co-processor 206", the DASD 208", the display and keyboard adapter 210", the floppy disk adapter 212", the CD-ROM adapter 214" and the network adapter 216". The network 216" may optionally be connected over a network to the publisher's workstation 142 and may also optionally be connected over a network to the generation workstation 140. In this manner, a copy of the stamped book 154 can be delivered to the end user's workstation 144 and also in this manner, a copy of the limited book reader program 146 may also be delivered to the end user's workstation 144.

The memory 200" of the end user's workstation 144 includes a number of registers, files, partitions, and programs. The book name register 240 is included in the memory 200", and also included is the hashed value h[Book] register 242, the key K(X) register 244, the F5 register 246, the F6 register 248. Also included in memory 200" is a softcopy book partition which contains a copy of the stamped book 154. Also contained in the memory 200" is a program partition 252 which contains a copy of the limited book reader program 148. Also included is the hashing program 258, an operating system 260 and the limited book reader program 148. The limited book reader program 148 will have the book validation program 100 test the value of the key K(X) from the stamped book 154 to determine if the key K(X) is a valid key for the publisher who has distributed the copy of the limited book reader program 148. If the key K(X) is found to be valid, through the execution of the book validation program 100, then the book reader program 152 is enabled and thereby can read the softcopy book 160. The partitions are shown in the memory 200" of FIG. 10, for storing the image of two pages from the softcopy book 160. Partition 254 shows page 1 in the image buffer from the softcopy book 160. Partition 256 shows page 2 in the image buffer from the softcopy book 160. The images of pages 1 and 2 are then displayed to the end user through the display adapter 210", in the normal manner of operation for the book reader program 152.

Figure 11:
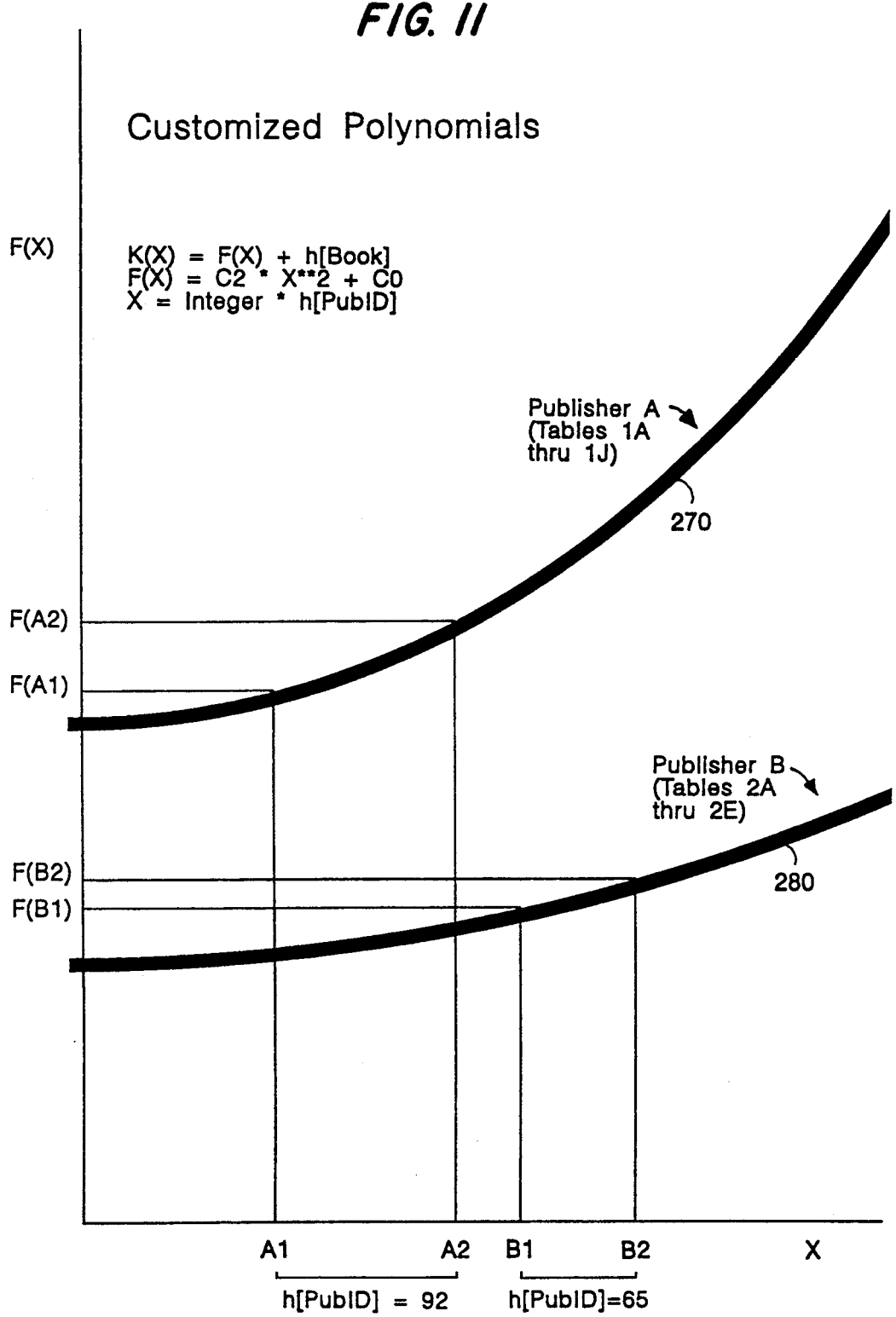
FIG. 11 is a graph of customized polynomials with a first polynomial assigned to a first publisher and a second polynomial assigned to a second publisher.

FIG. 11 provides an illustration of the principle of assigning customized polynomials to separate specialized publishers. This is done for the purpose of enabling unique, limited book reader programs 148 to be distributed by each respective publisher, which are capable of reading stamped books 154 published by that respective publisher. FIG. 11 shows a first customized polynomial graph 270 for publisher A. The graph 270 is of the polynomial F(X) versus X, for the values of C2, C0 and h[PubID] assigned to publisher A. The customized polynomial F(X) assigned to publisher A is C2 times X**2 plus C0. It can be seen that the possible values of X for publisher A will be positioned along the abscissa X and separated by intervals of magnitude equal to the hashed value h[PubID], which in this case is equal to 92. The values of the polynomial F(X) for values of X, are correspondingly separated along the F(X) axis for publisher A. The value K(X), which is the key 156 to be stamped into the book, is the value of F(X) plus the hashed value of the book ID, h[Book]. The term h[Book] offsets the value F(X) along the ordinate of the graph for the values of the key K(X).

It can be seen that publisher A can publish many books, and each book will have a different X value in Table 1E, resulting in points A1 and A2 along the X axis separated by integral multiples of the magnitude of 92 and corresponding points along the F(X) axis, F(A1) and F(A2), respectively. Those values are all unique to publisher A. A record can be kept of the prior X values assigned to a particular publisher so that no values overlap for a large series of publications for that particular publisher. By using a large random number in the generation of X, as is shown in Table 1E, the necessity for this is minimized. Publisher A's graph 270 in FIG. 11 corresponds to the computations shown in Tables 1A through 1J.

Similarly, the second publisher B has a different polynomial assigned to him, shown as graph 280 in FIG. 11. As can be seen from Table 2E, the publisher B's hashed ID value is h[PubID]=65. The possible values of X along the X axis of FIG. 11 for publisher B, for example B1 and B2, will be separated by integral multiples of the magnitude of 65. The corresponding values of F(X) along the F(X) axis, F(B1) and F(B2), for example, are uniquely governed by publisher B's customized polynomial. Publisher B can also have a large number of books published and each book will have a unique key 156 for its stamp. Publisher B's graph 280 in FIG. 11 corresponds to the computations shown in Tables 2A through 2E.

It can be seen that publisher A can have his limited book reader program read a large number of stamped books issued by publisher A but it can read no stamped books issued by publisher B. Correspondingly, this is also true for publisher B's limited book reader program. Table 1I shows publisher A's book validation program checking a first book which is the book *Hamlet* which was published by publisher A. Table 1I shows that the key value stamped in the first book is a valid key value and therefore the book is able to be read by the book reader program. Similarly, in Table 1J, publisher A's book validation program checks a second book, *Romeo and Juliet*, which has been published by publisher A. Table 1J shows the checking of the key value of which is found to be valid and therefore the second book is capable of being read by the book reading program. However, as is shown in Table 2F, publisher A's book validation program is applied to checking publisher B's first book, entitled *Foreign Import Car Repair Manual*. As is shown in Table 2F, the key value stamped in publisher B's book is detected as an invalid key by publisher A's book validation program, and therefore publisher B's book is not able to be read by publisher A's limited book reading program.

Reference to Tables 2A through 2E will show how key values are computed for publisher B, as a contrast to the key values computed for the publisher A. This is due to the assignment to publisher B of a different customized polynomial and inverse polynomial, than was assigned to publisher A, for Tables 1A through 1J.

Figure 14:
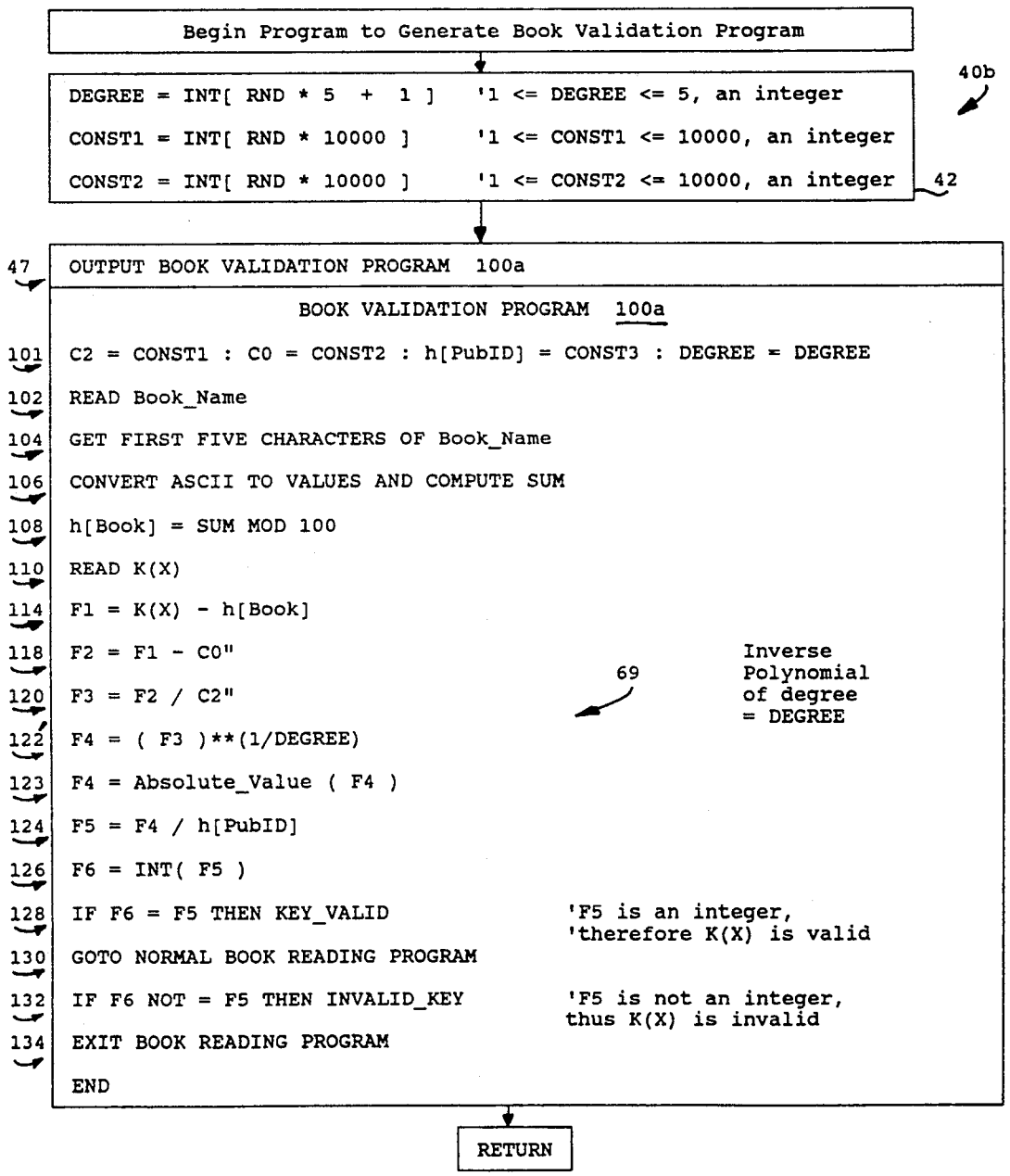

FIGS. 13 and 14 illustrate an alternate embodiment of the invention, for a program to generate the stamping tool program and to generate the book validation program. In FIG. 13, an alternate program 40a is shown in a flow diagram, to generate an alternate stamping tool program 70a. The program for generating the stamping tool program starts at step 42 with the computation of the constant DEGREE, CONST1, and CONST2, in a manner similar to that described previously in connection with FIG. 2.

Then the flow diagram 40a transfers to step 45, which outputs the stamping tool program 70a. The stamping tool program 70a consists of lines 71, 72, 74, 76, 78, 82, 84, 88, 90' and 92. Many of these lines are the same as the stamping tool program 70, with the exception of lines 71, and 90'. Line 71 defines the values of C2=CONST1, C0=CONST2, h[PubID]=CONST3, and the value DEGREE is assigned as the computed value for DEGREE. In line 90', the value of DEGREE is used as the exponent for the first term in the expression for K(X). In this manner, once the value for DEGREE is computed in step 42, it is available for assignment as the exponent of the polynomial expression in line 90'. The stamping tool program 70a is output by step 45 to the publisher, corresponding to step 30 of the flow diagram of FIG. 1.

In FIG. 14, the alternate program 40b is shown to generate the alternate book validation program 100a. The program begins with step 42 which computes the value for DEGREE, CONST1, and CONST2, in a manner similar to that described for FIG. 2.

Then the program transfers to step 47 which outputs the book validation program 100a. The book validation program 100a has the lines 101, 102, 104, 106, 108, 110, 114, 118, 120, 122', 123, 124, 126, 128, 130, 132 and 134. Most of these lines are the same as the code lines for the book validation program 100, except for lines 101 and 122'. Line 101 is the same as line 71 described above for the stamping tool program 70a, and it defines the values for the constants to be assigned in the book validation program 100a. Line 122' is the root computation for the inverse polynomial. The root computation takes the value of F3 to the power of one divided by DEGREE. By assigning a value for DEGREE in step 42, the root necessary for computing the inverse polynomial 69 is available on line 122'. Then the book validation 100a is output by step 47 of FIG. 14, to step 34 of FIG. 1, where it is linked to the normal book reader program, forming the limited book reader program.

In another alternate embodiment of the invention, the customized polynomial 65 and the customized inverse polynomial 69 can be computed without the use of the hashed value of the publisher's ID, h[PubID], although this will diminish the obscurity in key values K(X) which are produced. Referring to FIG. 5, for example, instead of multiplying X times h[PubID] in step 88 for the customized polynomial, another integer could be chosen, or indeed another real number could be chosen. That number will be the value which is required to be used as the divisor in the computation of the customized inverse polynomial in step 124 of FIG. 6. One can choose arbitrary numbers to substitute for the hashed value for the publisher's ID, and still be within the spirit and the scope of the invention disclosed herein.

The motivation to have obscure values generated for the key value K(X) is that the licensor of the book reader program 152', will want to avoid the possibility of having competitors reverse engineer the book validation program 100, and thereby circumvent its limitation to reading only those books published by a particular publisher. It is in the interest of the licensor to enhance the obscurity of the values generated for the key K(X), and therefore it is the preferred embodiment of the invention to use the hashed value of the publisher's ID, A h[PubID], in the computations for the customized polynomial 65 and the customized inverse polynomial 69, as previously described.

Figure 15A:
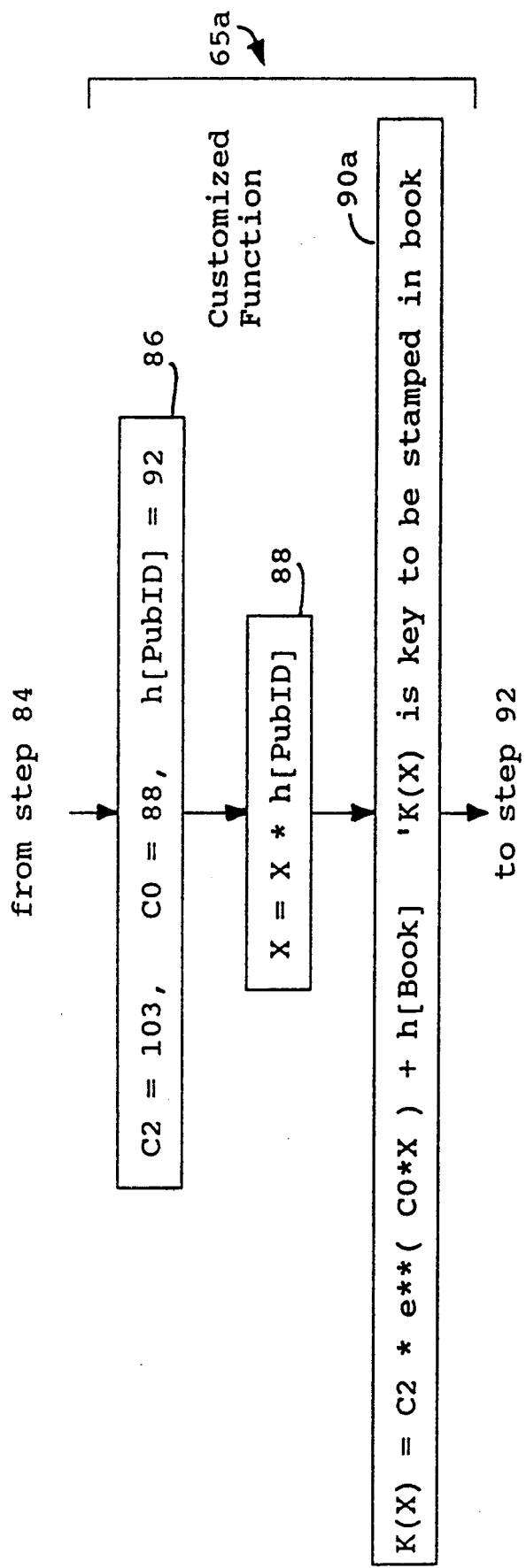

In another alternate embodiment of the invention, the customized polynomial can be generalized as a customized monotonic, single valued function. For example, in FIG. 15a, the exponential function $F(X) = C2*E**(C0*X)$ is a suitable function to serve as the function 65 in the stamping tool program 70 of FIG. 5. Its corresponding inverse function shown in FIG. 15b would serve as a suitable inverse function for use as inverse function 69 in the book validation program 100 of FIG. 6. A graph of the exponential function is shown in FIG. 15c. In FIG. 15a, the exponential function is the customized exponential function 65a as shown with the component steps 86 and 88 being the same as previously described. The step 90a carries out the computation of K(X) which is the sum of the exponential function plus the hashed value of book h[Book].

Figure 15B:
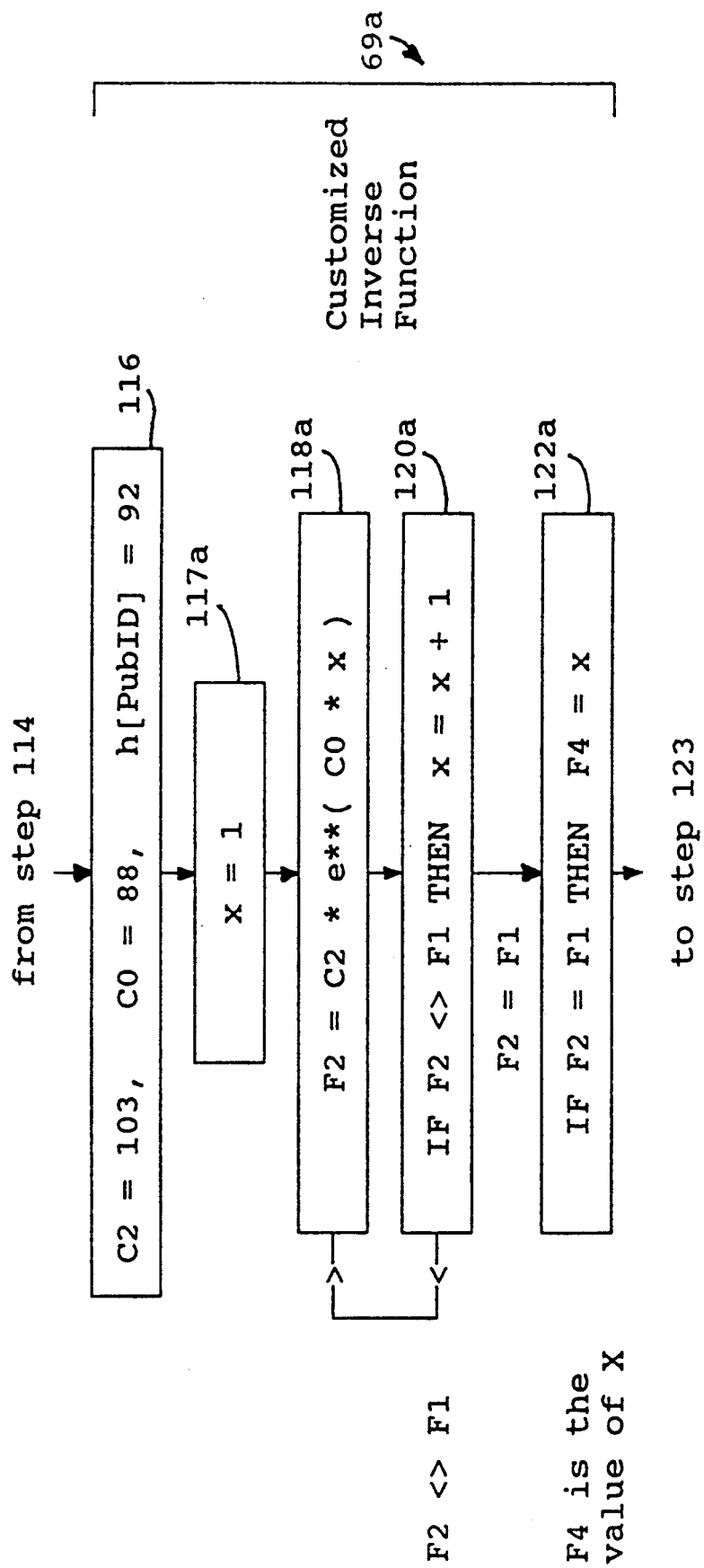
Figure 15C:
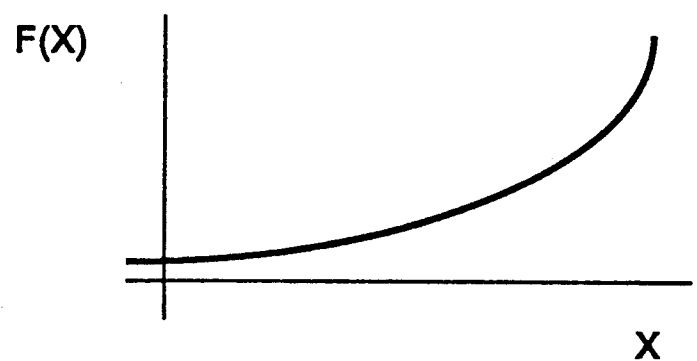
FIG. 15C shows a graph of the exponential function.
Figure 16C:
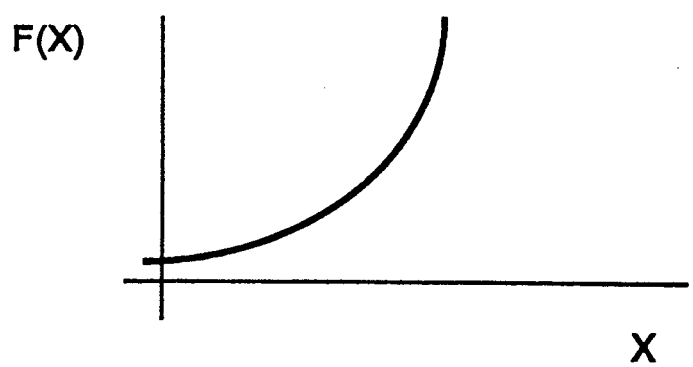
FIG. 16C shows a graph of the catenary function.
Figure 17C:
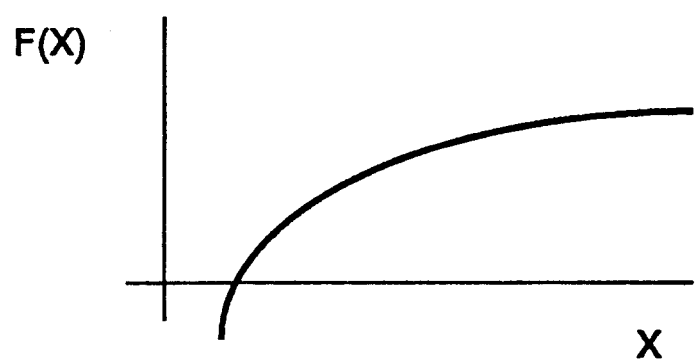
FIG. 17C depicts a graph of the logarithmic function.
Figure 18C:
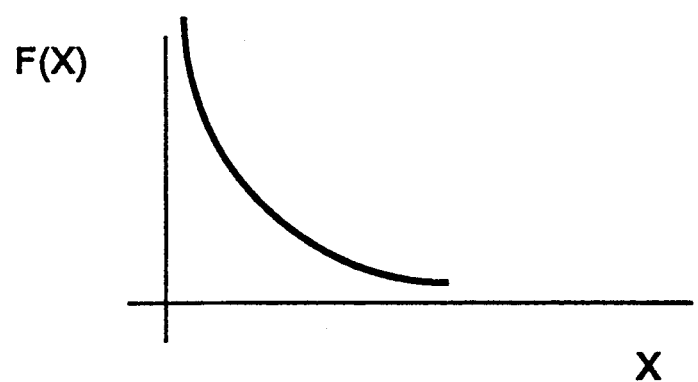
FIG. 18C depicts a graph of the equilateral hyperbola function.

The inverse exponential function shown in FIG. 15b is the customized inverse function 69a, which has step 116 the same as previously described. Step 117a sets the variable x=1 and then in step 118a, the computation is performed for the exponential function using as its argument, the value of x. Then in step 120a, it is determined whether the value for F2 computed in step 118a is not equal to F1 from step 114 of FIG. 6. If F2 is not equal to F1, then the value of x is incremented by one and the program of FIG. 15b flows back to step 118a and another computation for F2 is made, using the exponential function. After a number of iterations of steps 118a and 120a, when F2 equals F1, then the flow proceeds to step 122' which sets F4 equal to the value of x. F4 is the value X, if the key value K(X) was generated by the specialty publisher's stamping tool program 70. Then the program of FIG. 15b flows to step 123 in the book validation program of FIG. 6, in order to carry on with the determination as to whether the value of F5, which is F4 divided by the hashed value of the publisher's ID h[PubID], is an integer. As per the previous description of FIG. 6, if F5 is an integer, then the value of K(X) read from the book by the validation program 100, is a valid key value and the book is permitted to be read.

Figure 16A:
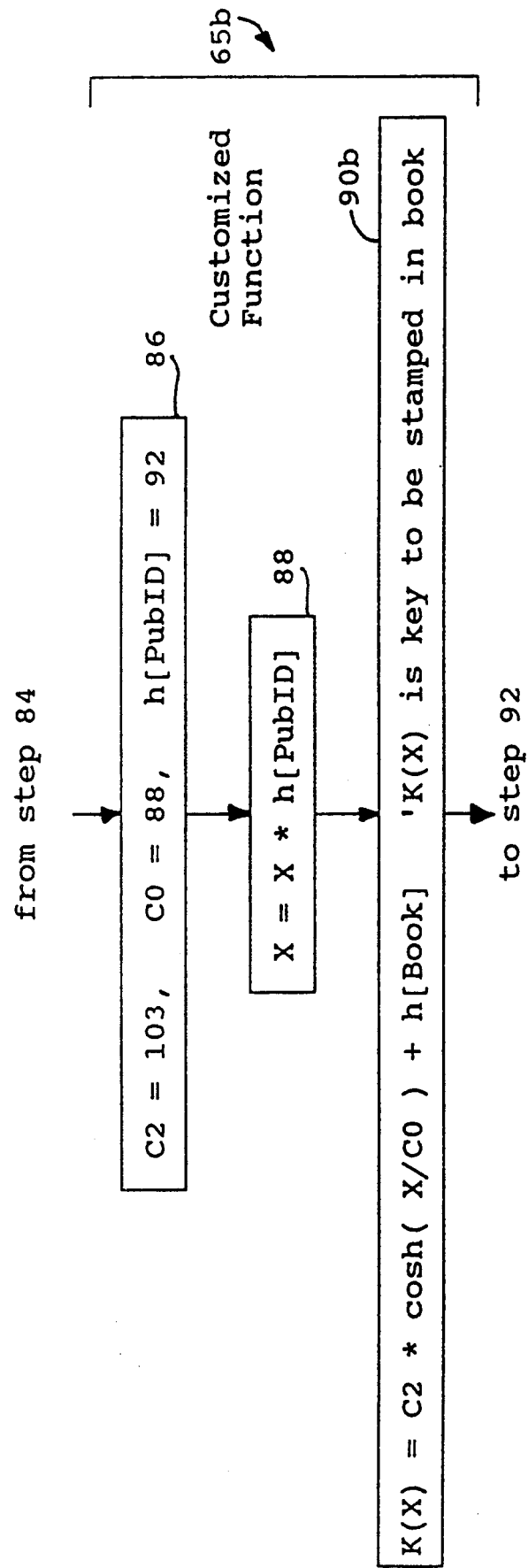
FIG. 16A is the customized catenary function 65b and FIG. 16B is the customized inverse catenary function 69b.
Figure 16B:
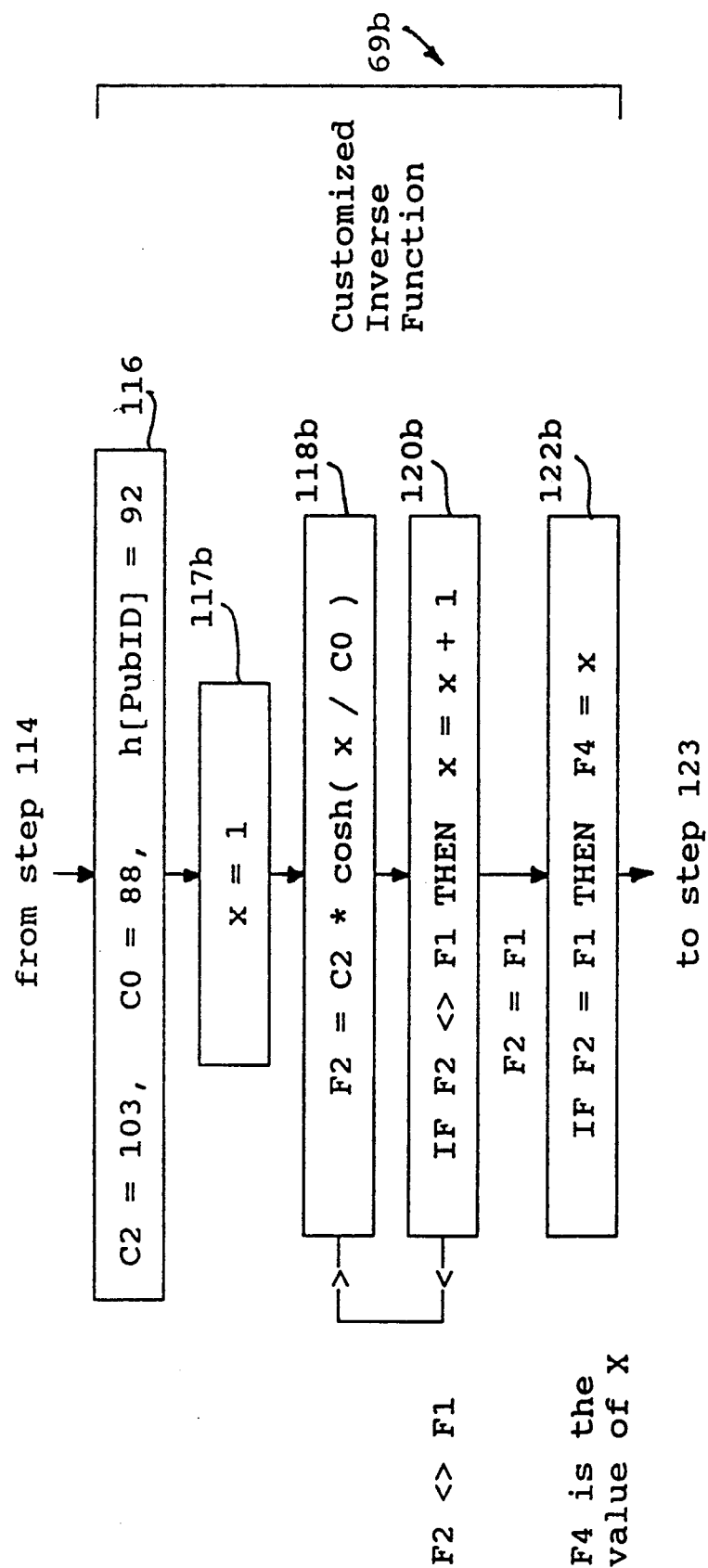

Another monotonic, single valued function suitable for use as the customized function is the catenary junction shown in FIG. 16a. The catenary function $F(X) = C2$ times $COSH(X/C0)$ is the customized function 65b, shown in FIG. 16a. Step 90b of FIG. 16a corresponds to step 90a of FIG. 15a. The corresponding inverse catenary function 69b, is shown in FIG. 16b. Steps 117b, 118b, 120b and 122b of FIG. 16a, correspond to steps 117a, 118a, 120a and 122a of FIG. 15a, respectively. The catenary function 65b can substitute for the customized polynomial 65 in FIG. 5. The inverse catenary function 69b can substitute for the customized inverse polynomial 69 of FIG. 6.

Figure 17A:
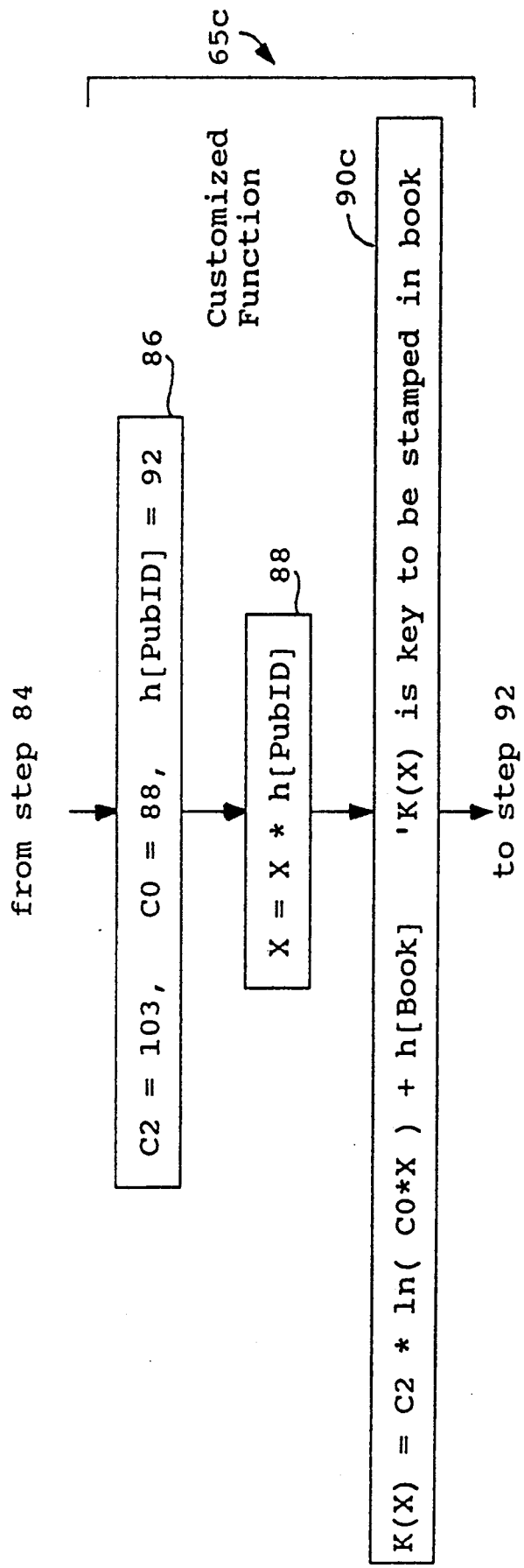
FIG. 17A is the customized logarithmic function 65c and FIG. 17B is the customized inverse logarithmic function 69c.
Figure 17B:
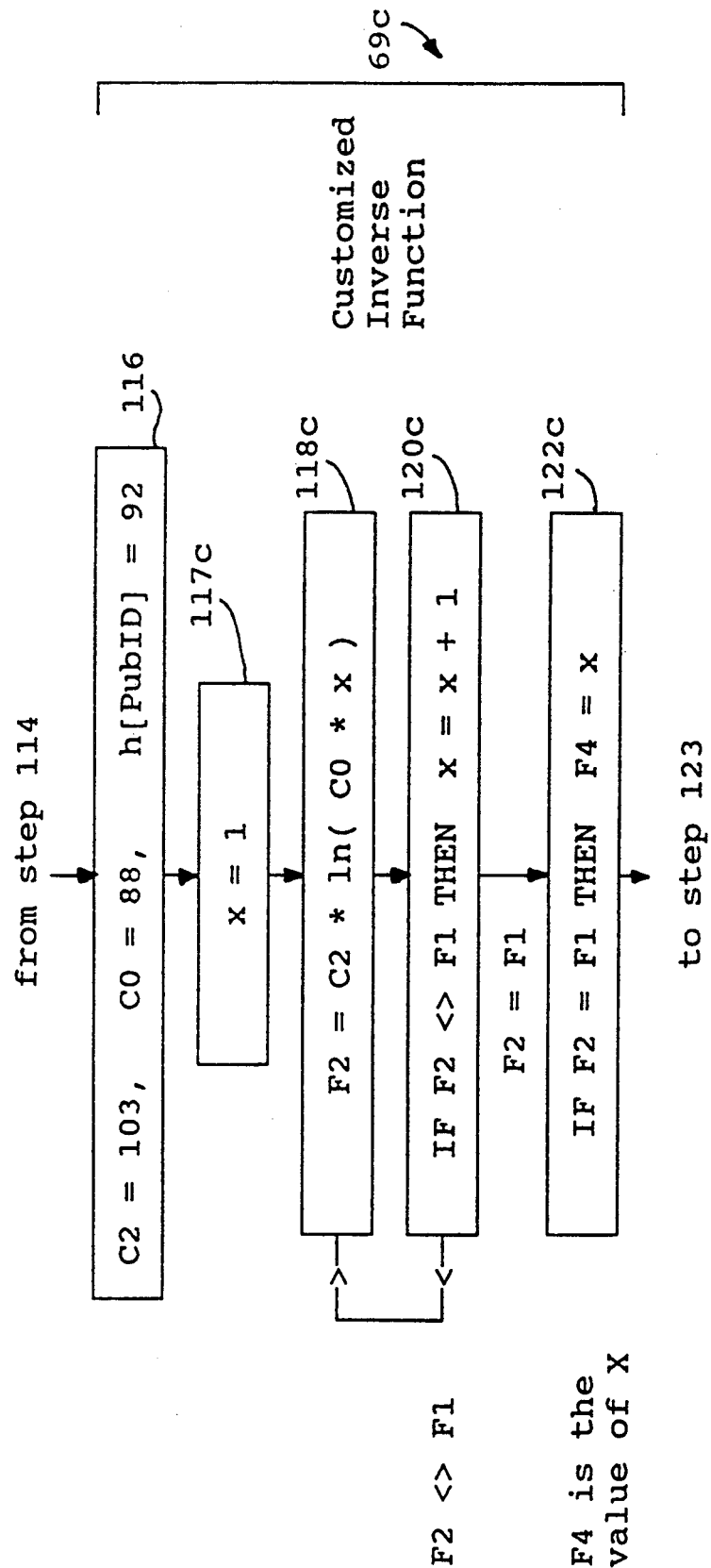

Still another suitable monotonic, single valued function is the logarithmic function shown in FIG. 17a, $F(X) = C2*\ln(C0*X)$. The corresponding inverse logarithmic function is shown in FIG. 17b. The customized function 65c which is the logarithmic function of FIG. 17a can substitute for the customized polynomial 65 of FIG. 5. Step 90c of FIG. 17a corresponds to step 90a of FIG. 15a. The inverse logarithmic function of FIG. 17b which is the customized inverse function 69c, can substitute for the customized inverse polynomial 69 of FIG. 6. Steps 117c, 118c, 120c and 122c of FIG. 17b correspond to steps 117a, 118a, 120a and 122a of FIG. 15b, respectively.

Figure 18A:
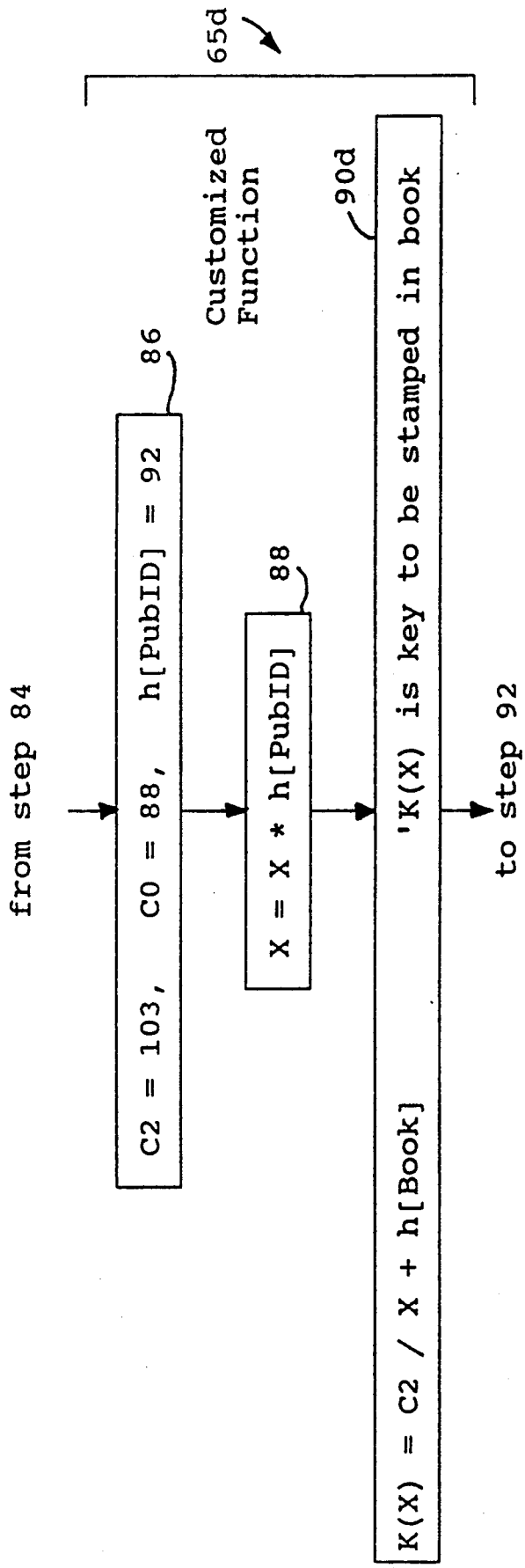
FIG. 18A is the customized equilateral hyperbola function 65d and FIG. 18B is the customized inverse equilateral hyperbola function 69d.
Figure 18B:
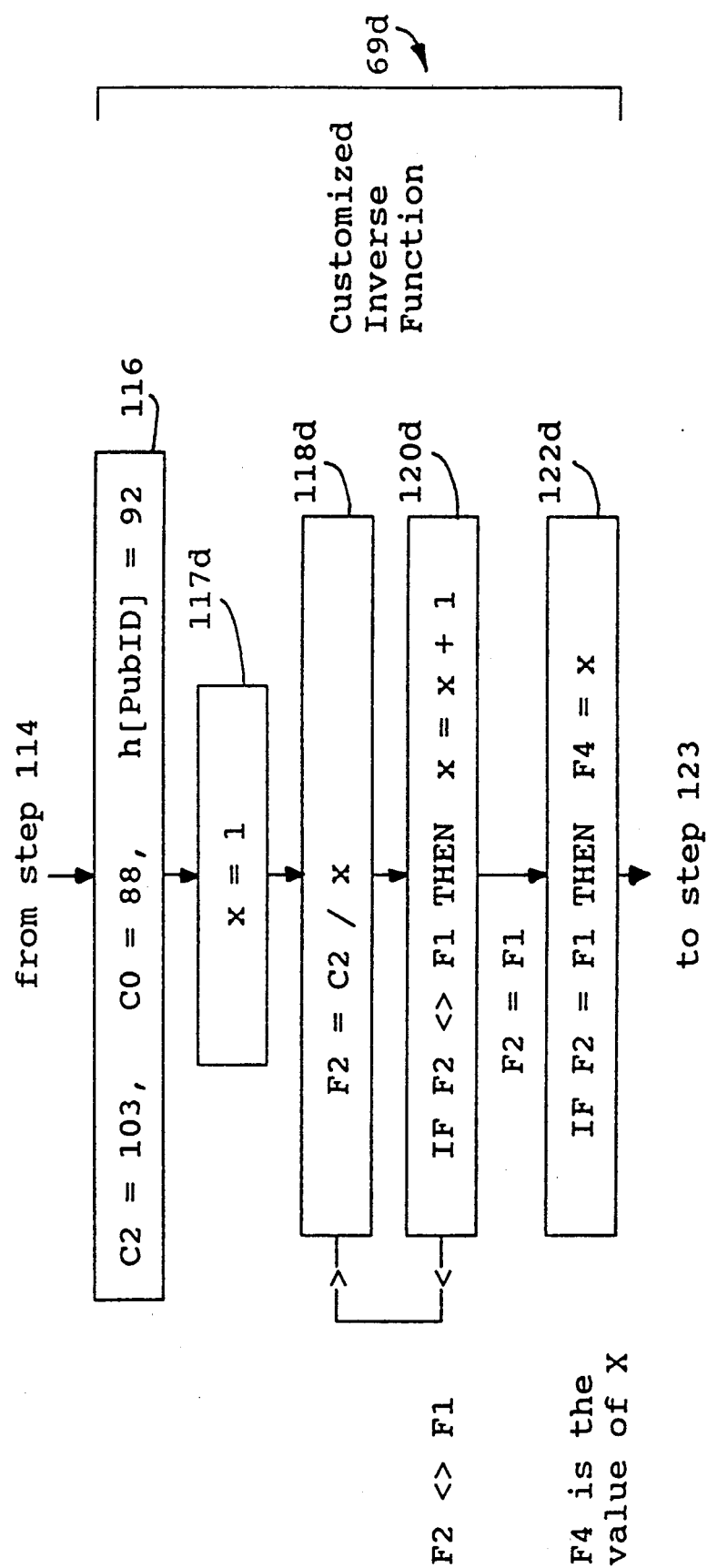

Still another suitable monotonic, single valued function is the equilateral hyperbola function $F(X) = C2/X$, shown in FIG. 18a. The equilateral hyperbola function is the customized function 65d. The corresponding inverse equilateral hyperbola function shown in FIG. 18b, is the customized inverse function 69d. The equilateral hyperbola function of 65d of FIG. 18a can substitute for the customized polynomial 65 of FIG. 5. The inverse equilateral hyperbola function 69d of FIG. 18b, can substitute for the customized inverse polynomial 69 of FIG. 6. Steps 117d, 118d, 120d and 122d of FIG. 18b correspond to steps 117a, 118a, 120a and 122a of FIG. 15b, respectively.

It can be seen that a variety of functional relationships between F(X) and X can be chosen for the customized function 65 and its customized inverse function 69, with the only limitation being the domain of X used in establishing values for F(X), provide a monotonic, single valued relationship between F(X) and X. The values for X are chosen to be a product of an integer times an expression which is characteristic of the specialty publisher. That product in the preferred embodiment is an integer times the hashed value of the publisher's ID, h[PubID]. In this manner, when the book validation program checks the key value stamped in a book, the resulting value of X found in the customized inverse function 69, divided by the hashed value of the publisher's ID h[PubID], yield an integer, only if the key K(X) is a valid key.

The resulting limited book reader program achieves the object of the invention of being limited to reading only those books which are published by a particular speciality publisher. The limited book reader program achieves the further objective of enabling the limited specialty publisher to publish a range of books from each of which can be read by the limited book reader program. In this manner, the specialty publisher can enhance the marketability of his softcopy book products by making available to his clientele, a low cost softcopy book reading program, while the licensor of the full function book reading program does not undercut the market for his book reader product.

Although a specific embodiment of the invention has been disclosed, it will be understood by those having skill in the art that changes can be made to that specific embodiment without departing from the spirit and the scope of the invention.

TABLE 1A
Computing hash value of Publisher A's Name
Publisher A: "Shakespeare Library Publishers, Inc."

| Name: | S | h | a | k | e |
|---|---|---|---|---|---|
| ASCII: | 83 | 104 | 97 | 107 | 101 |
| Sum ASCII = | 83 + 104 + 97 + 107 + 101 = 492 | | | | |
| h[PubID] = | CONST3 = 492 mod 100 = 92 | | | | |

TABLE 1B
Computing Constants for
Publisher A's Key Generator/Inverse Generator

DEGREE = RND * 5 + 1 = 2.134   'RND is
                                a Random number
                                0 < RND < 1
DEGREE = INT(DEGREE) = 2       'INT(DEGREE) is
                                the largest
                                integer < or = DEGREE
C2 = CONST1 = RND * 10000 = 103.34
C2 = INT(C2) = 103
C0 = CONST2 = RND * 10000 = 88.29
C0 = INT(C0) = 88

TABLE 1C
Stamping Tool Program for Publisher A

INPUT Book_Name
GET FIRST FIVE CHARACTERS OF Book_Name
CONVERT ASCII TO VALUES AND COMPUTE SUM
h[Book] = SUM MOD 100
X = RND * 10000
X = INT(X)
C2 = 103        ⎫
C0 = 88         ⎬ Customized
h[PubID] = 92   ⎭ Polynomial
X = X * h[PubID]
K(X) = C2 * X**2 + C0 + h[Book]   K(X) is the key to be
                                  stamped in a book
WRITE K(X) IN BOOKFILE TABLE 1C-continued
Stamping Tool Program for Publisher A

END

TABLE 1D
Computing the hash value
of a First Book for Publisher A

Book Title: "Hamlet"
| Name: | H | a | m | l | e |
|---|---|---|---|---|---|
| ASCII: | 72 | 97 | 109 | 108 | 101 |
| Sum ASCII = | 72 + 97 + 109 + 108 + 101 = 487 | | | | |
| h[Book] = | 487 mod 100 = 87 | | | | |

TABLE 1E
Computing the Key to be stamped
in Publisher A's First Book

X = RND * 10000 = 3.34
X = INT(X) = 3
X = X * h[PubID] = 3 * 92 = 276
K(X) = C2 * X**2 + C0 + h[Book]
     = 103 * 276**2 + 88 + 87
     = 103 * 76176 + 88 + 87
     = 7846128 + 88 + 87
     = 7846303

TABLE 1F
Computing the hash value
of a second Book for Publisher A

Book Title: "Romeo and Juliet"
| Name: | R | o | m | e | o |
|---|---|---|---|---|---|
| ASCII: | 82 | 111 | 109 | 101 | 111 |
| Sum ASCII = | 82 + 111 + 109 + 101 + 111 = 514 | | | | |
| h[Book] = | 514 mod 100 = 14 | | | | |

TABLE 1G
Computing the Key to be stamped
in Publisher A's Second Book

X = RND * 10000 = 7.34
X = INT(X) = 7
X = X * h[PubID] = 7 * 92 = 644
K(X) = C2 * X**2 + C0 + h[Book]
     = 103 * 644**2 + 88 + 14
     = 103 * 414736 + 88 + 14
     = 42717808 + 88 + 14
     = 42717910

TABLE 1H
Book Validation Program for Publisher A

READ Book_Name
GET FIRST FIVE CHARACTERS OF Book_Name
CONVERT ASCII TO VALUES AND COMPUTE SUM
h[Book] = SUM MOD 100
READ K(X)
F1 = K(X) − h[Book]
C2 = 103         ⎫
C0 = 88          ⎪
h[PubID] = 92    ⎬ Customized
F2 = F1 − C0     ⎪ Inverse
F3 = F2 / C2     ⎭ Polynomial
F4 = Square_Root ( F3 )
F4 = Absolute_Value ( F4 )
F5 = F4 / h[PubID]
F6 = INT( F5 )
IF F6 = F5 THEN KEY_VALID   'F5 is an integer,
                            therefore K(X) is valid
GOTO NORMAL BOOK READING PROGRAM
IF F6 NOT = F5 THEN INVALID_KEY  'F5 is not an integer,
                                 thus K(X) is invalid
EXIT BOOK READING PROGRAM

TABLE 1H-continued

Book Validation Program for Publisher A

END

TABLE 1I

Publisher A's Book Validation Program
Checking First Book

READ Book_Name = "Hamlet"
GET FIRST FIVE CHARACTERS OF Book_Name
= "H","a","m","l","e"
CONVERT ASCII TO VALUES AND COMPUTE SUM
= 72 + 97 + 109 + 108 + 101 = 487
h[Book] = SUM MOD 100 = 487 mod 100 = 87
READ K(X) = 7846303
F1 = K(X) − h[Book] = 7846303 − 87 = 7846216
C2 = 103        ⎫
C0 = 88         ⎪
h[PubID] = 92   ⎬ Customized
F2 = F1 − C0 = 7846216 − 88 = 7846128   Inverse
F3 = F2 / C2 = 7846128 / 103 = 76176    Polynomial
F4 = Square_Root ( F3 ) = 276           ⎭
F4 = Absolute_Value ( F4 ) = 276
F5 = F4 / h[PubID] = 276 / 92 = 3
F6 = INT( F5 ) = INT( 3 ) = 3
IF F6 = F5 THEN KEY_VALID  'F5 = 3, an integer,
                            therefore K(X) is valid
GOTO NORMAL BOOK READING PROGRAM

TABLE 1J

Publisher A's Book Validation Program
Checking Second Book

READ Book_Name = "Romeo and Juliet"
GET FIRST FIVE CHARACTERS OF Book_Name
= "R","o","m","e","o"
CONVERT ASCII TO VALUES AND COMPUTE SUM
= 82 + 111 + 109 + 101 + 111 = 514
h[Book] = SUM MOD 100 = 514 mod 100 = 14
READ K(X) = 42717910
F1 = K(X) − h[Book] = 42717910 − 14 = 42717896
C2 = 103        ⎫
C0 = 88         ⎪
h[PubID] = 92   ⎬ Customized
F2 = F1 − C0 = 42717896 − 88 = 42717808   Inverse
F3 = F2 / C2 = 42717808 / 103 = 414736    Polynomial
F4 = Square_Root ( F3 ) = 644             ⎭
F4 = Absolute_Value ( F4 ) = 644
F5 = F4 / h[PubID] = 644 / 92 = 7
F6 = INT( F5 ) = INT( 7 ) = 7
IF F6 = F5 THEN KEY_VALID  'F5 = 7, an integer,
                            therefore K(X) is valid
GOTO NORMAL BOOK READING PROGRAM

TABLE 2A

Computing the hash value
of Publisher B's Name

Publisher B:
"JimBob's Automobile Repair Publications, Inc."
Name:       J    i    m    B    o
ASCII:      74   105  109  66   111
Sum ASCII = 74 + 105 + 109 + 66 + 111 = 465
h[PubID] =     CONST3 = 465 mod 100 = 65

TABLE 2B

Computing Constants
for Publisher B's Key Generator/Inverse Generator

DEGREE = RND * 5 + 1 = 2.884
DEGREE = INT(DEGREE) = 2
C2 = RND * 10000 = 93.34
C2 = INT(C2) = 93
C0 = RND * 10000 = 78.29
C0 = INT(C0) = 78

TABLE 2C

Stamping Tool Program for Publisher B

INPUT Book_Name
GET FIRST FIVE CHARACTERS OF Book_Name
CONVERT ASCII TO VALUES AND COMPUTE SUM
h[Book] = SUM MOD 100
X = RND * 10000
X = INT(X)
C2 = 93
C0 = 78
h[PubID] = 65                       Customized
X = X * h[PubID]                    Polynomial
K(X) = C2 * X**2 + C0 + h[Book]    'K(X) is the key to be
                                    stamped in a book
WRITE K(X) IN BOOKFILE
END

TABLE 2D

Computing the hash value
of a First Book for Publisher B

Book Title: "Foreign Import Car Repair Manual"
Name:       F    o    r    e    i
ASCII:      70   111  114  101  105
Sum ASCII = 70 + 111 + 114 + 101 + 105 = 501
h[Book] =      501 mod 100 = 1

TABLE 2E

Computing the Key to be stamped
in Publisher B's First Book

X = RND * 10000 = 2.34
X = INT(X) = 2
X = X * h[PubID] = 2 * 65 = 130
K(X) = C2 * X**2 + C0 + h[Book]
     = 93 * 130**2 + 78 + 1
     = 93 * 16900 + 78 + 1
     = 1571700 + 78 + 1
     = 1571779

TABLE 2F

Publisher A's Book Validation Program
Checking Publisher B's First Book

READ Book_Name = "Foreign Import Car Repair Manual"
GET FIRST FIVE CHARACTERS OF Book_Name
= "F","o","r","e","i"
CONVERT ASCII TO VALUES AND COMPUTE SUM
= 70 + 111 + 114 + 101 + 105 = 501
h[Book] = SUM MOD 100 = 501 mod 100 = 1
READ K(X) = 1571779
F1 = K(X) − h[Book] = 1571779 − 1 = 1571778
C2 = 103        ⎫
C0 = 88         ⎪
h[PubID] = 92   ⎬ Customized
F2 = F1 − C0 = 1571778 − 88 = 1571690      Inverse
F3 = F2 / C2 = 1571690 / 103 = 15259.126   Polynomial
F4 = Square_Root ( F3 ) = 123.528          ⎭
F4 = Absolute_Value ( F4 ) = 123.528
F5 = F4 / h[PubID] = 123.528 / 92 = 1.345
F6 = INT( F5 ) = INT( 1.345 ) = 1
IF F6 NOT = F5 THEN INVALID_KEY  'F5 = 1.345 is
                                  not an integer, thus
                                  K(X) is not valid
EXIT BOOK READING PROGRAM
END

What is claimed is:

1. A data processing method for limiting a book reading program for softcopy books, to be for reading only softcopy books published by a selected publisher, comprising the steps of:

generating with a data processor, a customized polynomial expression to be associated with a selected softcopy book publisher;

merging with a data processor, said customized polynomial expression with a first shell program, forming a stamping tool program for stamping a key value onto a softcopy book published by said selected publisher;

generating with a data processor, a customized inverse polynomial expression to said customized polynomial expression, to be associated with said selected softcopy book publisher;

merging with a data processor, said customized inverse polynomial expression with a second shell program, forming a book validation program for validating said key value on said softcopy book published by said selected publisher and enabling a softcopy book reading program to read said softcopy book.

2. A data processing method for limiting a book reading program for softcopy books, to be for reading only softcopy books published by a selected publisher, comprising the steps of:

generating with a data processor, a customized polynomial expression to be associated with a selected softcopy book publisher;

generating with a data processor, a publisher identity value which is a hashed representation of an identifying characteristic of said selected publisher;

merging with a data processor, said customized polynomial expression and said publisher identity value with a first shell program, forming a stamping tool program for stamping a key value onto a softcopy book published by said selected publisher;

generating with a data processor, a first book identity value which is a hashed representation of an identifying characteristic of a first softcopy book published by said selected publisher;

computing a first key value with said stamping tool program using said first book identity value and affixing said first key value to said first softcopy book;

generating with a data processor, a customized inverse polynomial expression to said customized polynomial expression, to be associated with said selected softcopy book publisher;

merging with a data processor, said customized inverse polynomial expression and said publisher identity value with a second shell program, forming a book validation program for validating said first key value on said first softcopy book and enabling a softcopy took reading program to read said first softcopy book;

computing a first test value with said book validation program using said first book identity value and said first key value; and enabling a softcopy book reader program to read said first softcopy book when said first test value indicates said first key value was generated by said stamping tool program.

3. A limited book reading program for softcopy books, for reading only softcopy books published by a selected publisher, said books having a key expression incorporated therein formed from a customized polynomial expression which uniquely represents said selected publisher, comprising:

a customized program code module which includes a customized inverse polynomial expression to said customized polynomial expression, to be associated with said selected softcopy book publisher;

a shell program code module merged with said customized program code module, forming a book validation program for validating said key expression in a valid softcopy book published by said selected publisher and producing an enabling message;

a softcopy book reading program for reading said valid softcopy book in response to said enabling message.

4. A data processing system for limiting a book reading program for softcopy books, to be for reading only softcopy books published by a selected publisher, comprising:

a first data processor, for generating a customized polynomial expression to be associated with a selected softcopy book publisher;

said first data processor merging said customized polynomial expression with a first shell program, forming a stamping tool program for stamping a key value onto a softcopy book published by said selected publisher;

a second data processor coupled to said first data processor, for receiving said stamping tool program from said first data processor and affixing said key value onto a softcopy book published by said selected publisher, forming a validly stamped book;

said first data processor generating a customized inverse polynomial expression to said customized polynomial expression, to be associated with said selected softcopy book publisher;

said first data processor merging said customized inverse polynomial expression with a second shell program, forming a book validation program for validating said key value on said validly stamped book;

a third data processor coupled to said first data processor for receiving said book validation program and coupled to said second data processor for receiving said validly stamped book, and having a book reader program for reading softcopy books, for validating said key value on said validly stamped book and enabling said softcopy book reading program to read said validly stamped book.

5. A data processing system for limiting a book reading program for softcopy books, for reading only softcopy books published by a selected publisher, comprising:

a first data processor, for generating a customized polynomial expression to be associated with a selected softcopy book publisher;

said first data processor generating a publisher identity value which is a hashed representation of an identifying characteristic of said selected publisher;

said first data processor merging said customized polynomial expression and said publisher identity value with a first shell program, forming a stamping tool program for stamping a key value onto a softcopy book published by said selected publisher;

a second data processor coupled to said first data processor, for generating a first book identity value which is a hashed representation of an identifying characteristic of a first softcopy book published by said selected publisher;

said second data processor computing a first key value with said stamping tool program using said first book identity value and affixing said first key value to said first softcopy book;

said first data processor generating a customized inverse polynomial expression to said customized polynomial expression, to be associated with said selected softcopy book publisher;

said first data processor merging said customized inverse polynomial expression and said publisher identity value with a second shell program, forming a book validation program for validating said first key value on said first softcopy book and enabling a softcopy look reading program to read said first softcopy book;

a third data processor coupled to said first and said second data processors, for computing a first test value with said book validation program using said first book identity value and said first key value; and said third data processor enabling a softcopy book reader program to read said first softcopy book when said first test value indicates said first key value was generated by said stamping tool program.

6. A data processing method for limiting a book reading program for softcopy books, for reading only softcopy books published by a selected publisher, comprising the steps of:

generating with a data processor, a customized polynomial expression to be associated with a selected softcopy book publisher, said customized polynomial expression forming a stamping tool program for stamping a key value onto a softcopy book published by said selected publisher;

stamping a key value onto a softcopy book published by said selected publisher using said stamping tool program;

generating with a data processor, a customized inverse polynomial expression to said customized polynomial expression, to be associated with said selected softcopy book publisher, said customized inverse polynomial expression forming a book validation program for validating said key value on said softcopy book published by said selected publisher;

validating said key value on said softcopy book published by said selected publisher, using said book validation program; and enabling a softcopy book reading program to read said softcopy book in response to said book validation program validating said key value.

7. A data processing method for limiting a book reading program for softcopy books, for reading only softcopy books published by a selected publisher, comprising the steps of:

generating with a data processor, a customized monotonic, single valued function expression to be associated with a selected softcopy book publisher, said customized monotonic, single valued function expression forming a stamping tool program for stamping a key value onto a softcopy book published by said selected publisher;

stamping a key value onto a softcopy book published by said selected publisher using said stamping tool program;

generating with a data processor, a customized inverse monotonic, single valued function expression to said customized monotonic, single valued function expression, to be associated with said selected softcopy book publisher, said customized inverse monotonic, single valued function expression forming a book validation program for validating said key value on said softcopy book published by said selected publisher;

validating said key value on said softcopy book published by said selected publisher, using said book validation program; and enabling a softcopy book reading program to read said softcopy book in response to said book validation program validating said key value.

8. The method of claim 7 which further comprises:

said monotonic, single valued function has a value for its independent variable which is a product of an integer times a hashed value characteristic of said selected publisher;

said validating step further comprises:

determining an inverse value for said customized inverse monotonic, single valued function expression from said key value:

dividing said inverse value by said hashed value to obtain a quotient value; and determining if said quotient value is an integer.

9. A limited a book reading program process for softcopy books in a data processing system, for reading only softcopy books published by a selected publisher, said books stamped with a key formed with a customized monotonic, single valued function expression associated with a selected softcopy book publisher, comprising:

validating in a data processing system, a key value on said softcopy book published by said publisher, using a book validation program having a customized inverse monotonic, single valued function expression to said customized monotonic, single valued function expression, associated with said selected softcopy book publisher;

enabling in a data processing system, a softcopy book reading program to read said softcopy book in response to said book validation program validating said key value;

said monotonic, single valued function has a value for its independent variable which is a product of an integer times a hashed value characteristic of said selected publisher;

said validating step further comprises:

determining an inverse value for said customized inverse monotonic, single valued function expression from said key value:

dividing said inverse value by said hashed value to obtain a quotient value; and determining if said quotient value is an integer.

10. A stamping tool program process for stamping softcopy books in a data processing system, with a key formed with a customized monotonic, single valued function expression which is uniquely associated with a selected softcopy book publisher, comprising:

affixing in a data processing system, a key value on a softcopy book published by said selected publisher, using a stamping tool program having a customized monotonic, single valued function expression associated with a selected softcopy book publisher;

said key value resulting from said monotonic, single valued function having a value for its independent variable which is a product of an integer times a hashed value characteristic of said selected publisher;

said key value capable of being read by a book validation program to enable a softcopy book reading program to read said softcopy book in response to said book validation program validating said key value;

validating in a data processing system, said key value by determining an inverse value for a customized inverse monotonic, single valued function expression using said key value, dividing said inverse value by said hashed value to obtain a quotient value and determining if said quotient value is an integer.

11. A system for stamping softcopy books in a data processing system, with a key formed with a customized monotonic, single valued function expression which is uniquely associated with a selected softcopy book publisher, comprising:

a stamping tool means having a customized monotonic, single valued function expression associated with a selected softcopy book publisher, for affixing a key value on a softcopy book published by said selected publisher;

said key value resulting from said monotonic, single valued function having a value for its independent variable which is a product of an integer times a hashed value characteristic of said selected publisher;

said key value capable of being read by a book validation means to enable a softcopy book reading program to read said softcopy book in response to said book validation program validating said key value;

said book validation means validating said key value by determining an inverse value for a customized inverse monotonic, single valued function expression using said key value, dividing said inverse value by said hashed value to obtain a quotient value and determining if said quotient value is an integer.

12. A system for reading softcopy books, for reading only softcopy books published by a selected publisher, said books stamped with a key formed with a customized monotonic, single valued function expression associated with a selected softcopy book publisher, comprising:

a book validation means having a customized inverse monotonic, single valued function expression to said customized monotonic, single valued function expression, associated with said selected softcopy book publisher, for validating said key value on said softcopy book published by said selected publisher;

a softcopy book reading means coupled to said book validation means, for reading a softcopy book;

said book validation means enabling said softcopy book reading means to read said softcopy book in response to said book validation means validating said key value;

said monotonic, single valued function has a value for its independent variable which is a product of an integer times a hashed value characteristic of said selected publisher;

said book validation means further comprises:

means for determining an inverse value for said customized inverse monotonic, single valued function expression from said key value;

means for coupled to said determining means, for dividing said inverse value by said hashed value to obtain a quotient value; and means coupled to said dividing means, for determining if said quotient value is an integer.

* * * * *